(12) United States Patent
Jang et al.

(10) Patent No.: US 12,168,460 B2
(45) Date of Patent: Dec. 17, 2024

(54) SHARED VEHICLE SERVICE PROVIDING METHOD PERFORMED BY SERVER COMMUNICATING WITH USER DEVICE OF PASSENGER AND AUTONOMOUS VEHICLE

(71) Applicant: SOS Lab Co., Ltd., Gwangju (KR)

(72) Inventors: Jun Hwan Jang, Seongnam-si (KR); Hyo Jung Jang, Seongnam-si (KR)

(73) Assignee: SOS LAB Co., Ltd., Gwangju (KR)

( * ) Notice: Subject to any disclaimer, the term of this patent is extended or adjusted under 35 U.S.C. 154(b) by 0 days.

(21) Appl. No.: 18/472,775

(22) Filed: Sep. 22, 2023

(65) Prior Publication Data

US 2024/0013334 A1 Jan. 11, 2024

Related U.S. Application Data

(63) Continuation of application No. 17/341,992, filed on Jun. 8, 2021, now Pat. No. 11,803,932, which is a (Continued)

(30) Foreign Application Priority Data

Feb. 28, 2020 (KR) .................. 10-2020-0025274
Feb. 28, 2020 (KR) .................. 10-2020-0025275

(51) Int. Cl.
*B60W 60/00* (2020.01)
*G01C 21/34* (2006.01)
(Continued)

(52) U.S. Cl.
CPC .............. *B60W 60/00256* (2020.02); *B60W 60/00253* (2020.02); *G01C 21/343* (2013.01);
(Continued)

(58) Field of Classification Search
CPC ...... G06Q 50/30; G06Q 30/016; G06Q 50/40; G01C 21/3438; G01C 21/3415;
(Continued)

(56) References Cited

U.S. PATENT DOCUMENTS 8,989,053 B1 * 3/2015 Skaaksrud .............. H04W 4/80
370/255
9,256,852 B1 * 2/2016 Myllymaki .......... G06Q 10/083
(Continued)

FOREIGN PATENT DOCUMENTS

| JP | 2019-087045 A | 6/2019 |
| KR | 10-2019-0100894 A | 8/2019 |
| KR | 10-2019-0101288 A | 8/2019 |

OTHER PUBLICATIONS

U.S. Office Action, U.S. Appl. No. 17/341,992, dated Feb. 8, 2023, 16 pages.
(Continued)

*Primary Examiner* — Dale W Hilgendorf
(74) *Attorney, Agent, or Firm* — Knobbe Martens Olson & Bear, LLP

(57) ABSTRACT

Proposed is a shared vehicle service providing method based on a shared vehicle management server communicating with a shared vehicle and a user device. Also proposed is a shared vehicle service providing method for managing an article of a shared vehicle user on the basis of a shared vehicle management server. For example, proposed is a shared vehicle service providing method in which a shared vehicle management server manages dispatch of a shared vehicle and an article of a user on the basis of data acquired from the shared vehicle and a user device.

8 Claims, 23 Drawing Sheets

Related U.S. Application Data continuation of application No. 17/036,402, filed on Sep. 29, 2020, now Pat. No. 11,062,416.

(51) Int. Cl.

| | | |
|---|---|---|
| *G06Q 30/016* | (2023.01) | |
| *G06Q 50/40* | (2024.01) | |
| *G08G 1/00* | (2006.01) | |
| *G08G 1/133* | (2006.01) | |
| *H04L 67/12* | (2022.01) | |

(52) U.S. Cl.
CPC ............ *G06Q 50/40* (2024.01); *G08G 1/133* (2013.01); *G08G 1/202* (2013.01); *H04L 67/12* (2013.01); *B60W 2420/403* (2013.01); *B60W 2420/408* (2024.01); *B60W 2556/10* (2020.02); *B60W 2556/45* (2020.02); *G06Q 30/016* (2013.01)

(58) Field of Classification Search
CPC ...... G01C 21/343; G08G 1/202; G08G 1/133; H04L 67/12; B60W 60/00253; B60W 60/00256; B60W 2420/52; B60W 2556/10; B60W 2420/42; B60W 2556/45; B60W 2420/403; B60W 2420/408
See application file for complete search history.

(56) References Cited

U.S. PATENT DOCUMENTS

| | | | | |
|---|---|---|---|---|
| 10,289,922 | B1* | 5/2019 | Wengreen | G05D 1/0088 |
| 10,380,667 | B2* | 8/2019 | Balasubramanian | H04W 4/40 |
| 10,706,711 | B2* | 7/2020 | Hirose | G05D 1/0088 |
| 10,796,174 | B2* | 10/2020 | Zhang | G08B 21/24 |
| 11,062,416 | B1* | 7/2021 | Jang | G06V 10/95 |
| 11,599,617 | B2* | 3/2023 | McManus | G06Q 10/06315 |
| 11,803,932 | B2* | 10/2023 | Jang | G06V 20/59 |
| 2012/0041675 | A1* | 2/2012 | Juliver | G06Q 30/0283 |
| | | | | 701/465 |
| 2015/0199619 | A1* | 7/2015 | Ichinose | G06Q 10/02 |
| | | | | 705/5 |
| 2016/0332535 | A1* | 11/2016 | Bradley | G06Q 10/083 |
| 2017/0098364 | A1* | 4/2017 | Jaegal | B60Q 9/00 |
| 2017/0213165 | A1* | 7/2017 | Stauffer | G06Q 10/02 |
| 2018/0215376 | A1* | 8/2018 | Kuhara | G05D 1/0212 |
| 2018/0350024 | A1* | 12/2018 | Kaufman | G06Q 50/14 |
| 2019/0066516 | A1* | 2/2019 | Kuhara | G05D 1/0016 |
| 2019/0258990 | A1* | 8/2019 | Makita | G06Q 10/00 |
| 2019/0287063 | A1* | 9/2019 | Skaaksrud | G05D 1/65 |
| 2020/0005059 | A1* | 1/2020 | Yamada | G08B 21/24 |
| 2020/0051194 | A1* | 2/2020 | Park | G06Q 50/40 |
| 2020/0109957 | A1* | 4/2020 | Shiga | B60W 30/00 |
| 2020/0110404 | A1* | 4/2020 | Shiga | G05D 1/0022 |
| 2020/0137547 | A1* | 4/2020 | Affeldt | H04W 8/005 |
| 2020/0202149 | A1* | 6/2020 | Zhang | G06V 20/59 |
| 2020/0270931 | A1* | 8/2020 | Bradley | B60N 2/002 |
| 2020/0271461 | A1* | 8/2020 | Yamashita | G06Q 10/06315 |
| 2020/0310438 | A1* | 10/2020 | Suzuki | G05D 1/0212 |
| 2020/0348668 | A1* | 11/2020 | Poulet | G05D 1/0088 |
| 2021/0279664 | A1* | 9/2021 | Fujii | G06Q 10/06315 |
| 2021/0295461 | A1 | 9/2021 | Jang et al. | |
| 2021/0304131 | A1* | 9/2021 | Yamamoto | G06Q 10/0832 |
| 2022/0159330 | A1* | 5/2022 | Stevens | H04N 21/25825 |
| 2022/0301430 | A1* | 9/2022 | Sudo | H04N 7/183 |
| 2022/0414811 | A1* | 12/2022 | Liotta | G05D 1/0287 |
| 2023/0342706 | A1* | 10/2023 | Hawley | G06Q 10/08355 |

OTHER PUBLICATIONS

U.S. Notice of Allowance, U.S. Appl. No. 17/341,992, dated Jun. 23, 2023, 10 pages.

* cited by examiner

FIG. 12

| | PASSENGER | VEHICLE | STARTING POINT (PICKUP LOCATION) | DEPARTURE TIME | DESTINATION (DROP-OFF LOCATION) | ARRIVAL TIME | TRAVEL TIME | COST (WON) |
|---|---|---|---|---|---|---|---|---|
| SERVICE 1 | ID #1 | VEHICLE 1 | X-X, H STREET, A CITY | 2019.09.28, 10:00 | Y-Y, J STREET, A CITY | 2019.09.28, 12:00 | 2 HOURS | 15,000 |
| SERVICE 2 | ID #2 | VEHICLE 2 | Z-Z, I STREET, B CITY | 2020.01.22, 15:00 | W-W, K STREET, B CITY | 2020.01.22, 15:30 | 0.5 HOURS | 4,000 |
| ... | ... | ... | ... | ... | ... | ... | ... | ... |

FIG. 13

| VEHICLE | VEHICLE TYPE | NUMBER OF PASSENGERS | VEHICLE STAT | CURRENT LOCATION |
|---|---|---|---|---|
| VEHICLE 1 | SUV | 8 PEOPLE | RESERVED | Y-Y, I STREET, A CITY |
| VEHICLE 2 | SEDAN | 4 PEOPLE | IN USE | W-W, K STREET, B CITY |
| . . . | . . . | . . . | . . . | . . . |

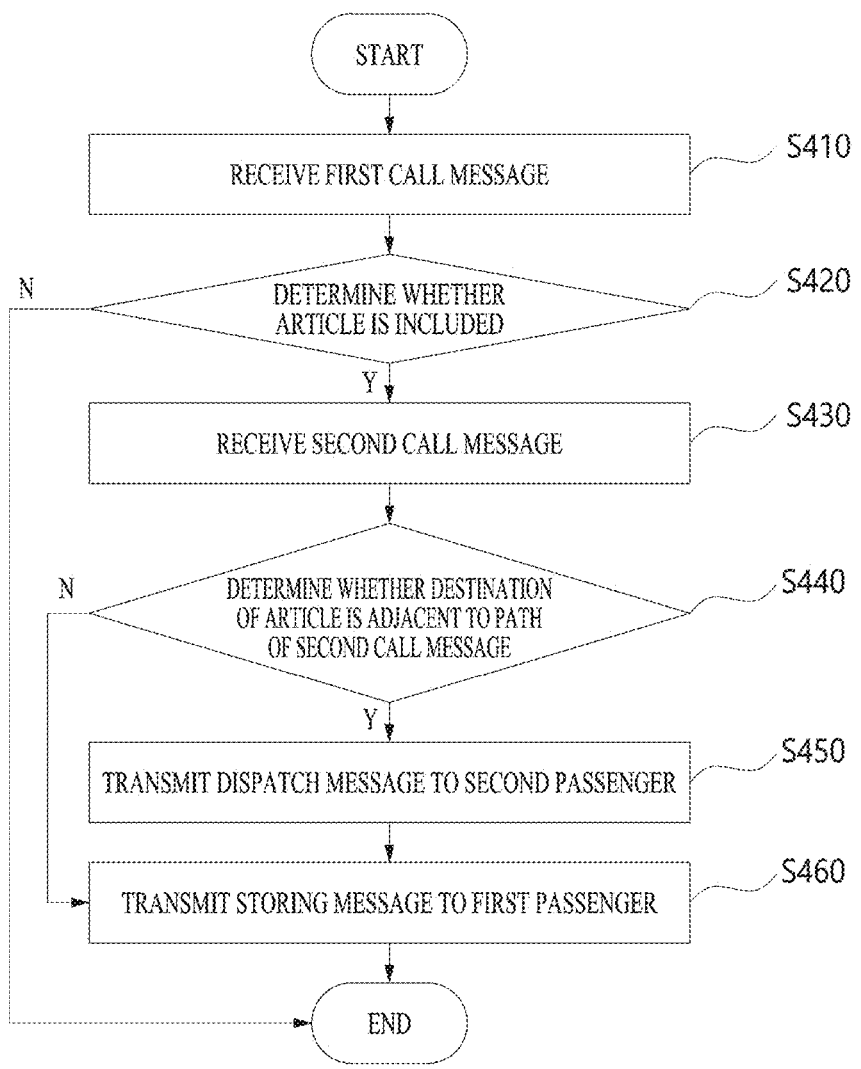

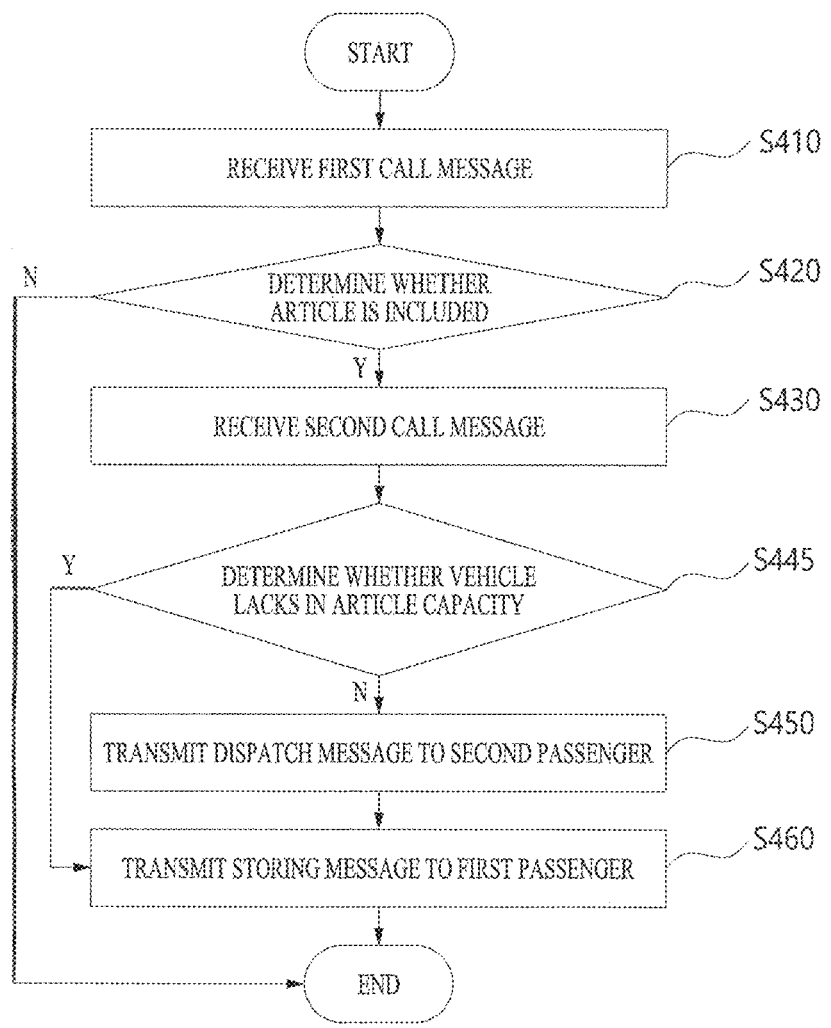

SHARED VEHICLE SERVICE PROVIDING METHOD PERFORMED BY SERVER COMMUNICATING WITH USER DEVICE OF PASSENGER AND AUTONOMOUS VEHICLE

INCORPORATION BY REFERENCE TO ANY PRIORITY APPLICATIONS

This application is a continuation of U.S. patent application Ser. No. 17/341,992, filed on Jun. 8, 2021, now U.S. Pat. No. 11,803,932, issued on Oct. 31, 2023, which is a continuation of U.S. patent application Ser. No. 17/036,402, filed on Sep. 29, 2020, now U.S. Pat. No. 11,062,416, issued on Jul. 13, 2021, which claims priority to and the benefit of Korean Patent Application No. 10-2020-0025274, filed on Feb. 28, 2020, and Korean Patent Application No. 10-2020-0025275, filed on Feb. 28, 2020, the disclosures of each of which are incorporated herein by reference in their entirety.

BACKGROUND

Technical Field

The present disclosure relates to a shared vehicle, a shared vehicle service providing device, a shared vehicle service management server, a shared vehicle service providing system, and a shared vehicle service providing method.

Description of Related Technology

Recently, results of development in various industrial fields are being applied to vehicles, and vehicle-related technology is being developed. Accordingly, research and development on autonomous vehicles continues. In this way, various services related to autonomous vehicles are appearing.

SUMMARY

The present disclosure is directed to providing a method of managing a shared vehicle service.

According to an aspect of the present disclosure, there is provided a method for providing a shared vehicle service performed by a server communicating with a user device of a passenger and an autonomous vehicle, comprising: performing a dispatch management of the autonomous vehicle by receiving a call message including a pickup location and a drop-off location from the user device and dispatching the autonomous vehicle to the pickup location; receiving an emergency message related to a lost article of a first passenger who had used the shared vehicle service and got off from the autonomous vehicle; determining whether the autonomous vehicle is dispatched after dropping off the first passenger; when the autonomous vehicle is in an available state, dispatching the autonomous vehicle to the first passenger; and when the autonomous vehicle is dispatched to a second passenger, transmitting a message asking whether the shared vehicle service is canceled or not for the dispatched autonomous vehicle to a second user device of the second passenger, and receiving a message indicating whether the shared vehicle service is canceled or not from the second user device, wherein when the message received from the second user device indicates the shared vehicle service is canceled, the autonomous vehicle is dispatched to the first passenger, and wherein when the message received from the second user device indicates the shared vehicle service is not canceled, the autonomous vehicle is dispatched to the first passenger after dropping off the second passenger.

According to another aspect of the present disclosure, there is provided a non-transitory computer-readable storage medium storing instructions that, when executed by a processor, cause the processor to perform a method for providing a shared vehicle service comprising: performing a dispatch management of an autonomous vehicle by receiving a call message including a pickup location and a drop-off location from a user device and dispatching the autonomous vehicle to the pickup location; receiving an emergency message related to a lost article of a first passenger who had used the shared vehicle service and dropped off from the autonomous vehicle; determining whether the autonomous vehicle is dispatched after dropping off the first passenger; when the autonomous vehicle is in an available state, dispatching the autonomous vehicle to the first passenger; and when the autonomous vehicle is dispatched to a second passenger, transmitting a message asking whether the shared vehicle service is canceled or not for the dispatched autonomous vehicle to a second user device of the second passenger, and receiving a message indicating whether the shared vehicle service is canceled or not from the second user device, wherein when the message received from the second user device indicates the shared vehicle service is canceled, the autonomous vehicle is dispatched to the first passenger, and wherein when the message received from the second user device indicates the shared vehicle service is not canceled, the autonomous vehicle is dispatched to the first passenger after dropping off the second passenger.

According to another aspect of the present disclosure, there is provided a method for providing a shared vehicle service performed by a server communicating with a user device of passenger and an autonomous vehicle, comprising: performing a dispatch management of the autonomous vehicle by receiving a call message including a pickup location and a drop-off location from the user device and dispatching the autonomous vehicle to the pickup location; receiving an emergency message related to a lost article of a first passenger who had used the shared vehicle service and dropped off from the autonomous vehicle; determining whether the autonomous vehicle is dispatched after dropping off the first passenger; when the autonomous vehicle is in an available state, transmitting a message indicating a delivery of the lost article to the first user device of the first passenger and dispatching the autonomous vehicle to the first passenger; and when the autonomous vehicle is dispatched to a second passenger, transmitting a message indicating a delivery delay of the lost article to the first user device of the first passenger and dispatching the autonomous vehicle to the first passenger after dropping off the second passenger.

According to another aspect of the present disclosure, there is provided a method for providing a shared vehicle service performed by a server communicating with a user device of a passenger and an autonomous vehicle, comprising: performing a dispatch management of the autonomous vehicle by receiving a call message including a pickup location and a drop-off location from the user device and dispatching the autonomous vehicle to the pickup location; dispatching a first vehicle to a first passenger; and receiving an emergency message related to a lost article of a second passenger who had used the shared vehicle service with the first vehicle before the first passenger; wherein, when the emergency message is received, the shared vehicle providing method comprising: when if a driving for the first passenger has not started, cancelling the dispatch of the first vehicle for the first passenger, transmitting a cancel message of the shared vehicle service related to the first vehicle, and dispatching the first vehicle to the second passenger, and when if the driving for the first passenger has started, transmitting a message of a deliver delay for the lost article to the second user device of the second passenger, and dispatching the first vehicle to the second passenger after the driving for the first passenger has been done.

According to another aspect of the present disclosure, there is provided a non-transitory computer-readable storage medium storing instructions that, when executed by a processor, cause the processor to perform a method for providing a shared vehicle service comprising: performing a dispatch management of an autonomous vehicle by receiving a call message including a pickup location and a drop-off location from a user device and dispatching the autonomous vehicle to the pickup location; dispatching a first vehicle to a first passenger; and receiving an emergency message related to a lost article of a second passenger who had used the shared vehicle service with the first vehicle before the first passenger; wherein, when the emergency message is received, the shared vehicle providing method comprising: when if a driving for the first passenger has not started, cancelling the dispatch of the first vehicle for the first passenger, transmitting a cancel message of the shared vehicle service related to the first vehicle, and dispatching the first vehicle to the second passenger, and when if the driving for the first passenger has started, transmitting a message of a deliver delay for the lost article to the second user device of the second passenger, and dispatching the first vehicle to the second passenger after the driving for the first passenger has been done.

Solutions for solving the problems of the present disclosure are not limited to the above-described solutions, and other unmentioned solutions may be clearly understood by those skilled in the art from this disclosure and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

FIG. 12 is a table showing service-use history data stored in the shared vehicle management server according to the exemplary embodiment of the present disclosure.

FIG. 13 is a table showing vehicle information data stored in the shared vehicle management server according to the exemplary embodiment of the present disclosure.

FIGS. 21 to 23 illustrate a shared vehicle management process related to article storing according to the exemplary embodiment of the present disclosure when a plurality of users use the shared vehicle service.

DETAILED DESCRIPTION

Figure 1:
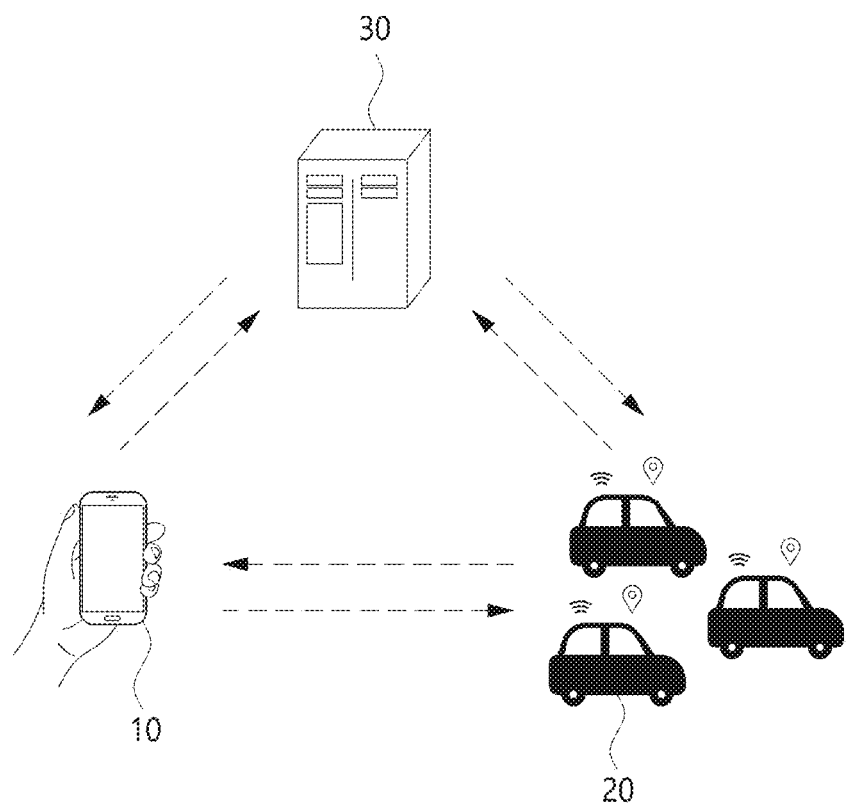
FIG. 1 is a diagram illustrating a shared vehicle service providing system according to an exemplary embodiment of the present disclosure.

In addition, with the universalization of autonomous vehicles, various researchers expect the ownership of a vehicle to be gradually shared in consideration of costs, environmental effects, users' convenience, and the like. Further, with the development of Internet technology, the connectivity between a user device and a vehicle is being improved, and autonomous vehicle sharing services tend to gradually appear to various users on the basis of the development of autonomous vehicle technology.

Hereinafter, specific embodiments of the present disclosure will be described in detail with reference to the accompanying drawings. However, the spirit of the present disclosure is not limited to the embodiments set forth herein. Those of ordinary skill in the art to which the present disclosure pertains can easily propose other inventions included in the scope of a regressive invention or the present disclosure by adding, changing, removing, etc. elements within the scope of the present disclosure, but the embodiments also fall within the scope of the present disclosure.

Throughout the drawings of embodiments, elements having the same functionality within the same spirit will be indicated by the same reference signs.

According to an aspect of the present disclosure, there is provided a method for providing a shared vehicle service performed by a server communicating with a user device of a passenger and an autonomous vehicle, comprising: performing a dispatch management of the autonomous vehicle by receiving a call message including a pickup location and a drop-off location from the user device and dispatching the autonomous vehicle to the pickup location; receiving an emergency message related to a lost article of a first passenger who had used the shared vehicle service and got off from the autonomous vehicle; determining whether the autonomous vehicle is dispatched after dropping off the first passenger; when the autonomous vehicle is in an available state, dispatching the autonomous vehicle to the first passenger; and when the autonomous vehicle is dispatched to a second passenger, transmitting a message asking whether the shared vehicle service is canceled or not for the dispatched autonomous vehicle to a second user device of the second passenger, and receiving a message indicating whether the shared vehicle service is canceled or not from the second user device, wherein when the message received from the second user device indicates the shared vehicle service is canceled, the autonomous vehicle is dispatched to the first passenger, and wherein when the message received from the second user device indicates the shared vehicle service is not canceled, the autonomous vehicle is dispatched to the first passenger after dropping off the second passenger.

In addition, the method further comprises, when the autonomous vehicle is in the available state, transmitting a message indicating a delivery of the lost article to the first user device of the first passenger; and when the message received from the second user device indicates the shared vehicle service is canceled, the message indicating a delivery of the lost article is transmitted to the first user device.

In addition, when the message received from the second user device indicates the shared vehicle service is not canceled, a message indicating a delivery delay of the lost article is transmitted to the first user device of the first passenger.

In addition, when the message received from the second user device indicates the shared vehicle service is canceled, another autonomous vehicle is dispatched to the second passenger.

In addition, when the message received from the second user device indicates the shared vehicle service is canceled, a reward which is at least available at cost of the shared vehicle service is offered.

According to another aspect of the present disclosure, there is provided a non-transitory computer-readable storage medium storing instructions that, when executed by a processor, cause the processor to perform a method for providing a shared vehicle service comprising: performing a dispatch management of an autonomous vehicle by receiving a call message including a pickup location and a drop-off location from a user device and dispatching the autonomous vehicle to the pickup location; receiving an emergency message related to a lost article of a first passenger who had used the shared vehicle service and dropped off from the autonomous vehicle; determining whether the autonomous vehicle is dispatched after dropping off the first passenger; when the autonomous vehicle is in an available state, dispatching the autonomous vehicle to the first passenger; and when the autonomous vehicle is dispatched to a second passenger, transmitting a message asking whether the shared vehicle service is canceled or not for the dispatched autonomous vehicle to a second user device of the second passenger, and receiving a message indicating whether the shared vehicle service is canceled or not from the second user device, wherein when the message received from the second user device indicates the shared vehicle service is canceled, the autonomous vehicle is dispatched to the first passenger, and wherein when the message received from the second user device indicates the shared vehicle service is not canceled, the autonomous vehicle is dispatched to the first passenger after dropping off the second passenger.

According to another aspect of the present disclosure, there is provided a method for providing a shared vehicle service performed by a server communicating with a user device of passenger and an autonomous vehicle, comprising: performing a dispatch management of the autonomous vehicle by receiving a call message including a pickup location and a drop-off location from the user device and dispatching the autonomous vehicle to the pickup location; receiving an emergency message related to a lost article of a first passenger who had used the shared vehicle service and dropped off from the autonomous vehicle; determining whether the autonomous vehicle is dispatched after dropping off the first passenger; when the autonomous vehicle is in an available state, transmitting a message indicating a delivery of the lost article to the first user device of the first passenger and dispatching the autonomous vehicle to the first passenger; and when the autonomous vehicle is dispatched to a second passenger, transmitting a message indicating a delivery delay of the lost article to the first user device of the first passenger and dispatching the autonomous vehicle to the first passenger after dropping off the second passenger.

According to another aspect of the present disclosure, there is provided a method for providing a shared vehicle service performed by a server communicating with a user device of a passenger and an autonomous vehicle, comprising: performing a dispatch management of the autonomous vehicle by receiving a call message including a pickup location and a drop-off location from the user device and dispatching the autonomous vehicle to the pickup location; dispatching a first vehicle to a first passenger; and receiving an emergency message related to a lost article of a second passenger who had used the shared vehicle service with the first vehicle before the first passenger; wherein, when the emergency message is received, the shared vehicle providing method comprising: when if a driving for the first passenger has not started, cancelling the dispatch of the first vehicle for the first passenger, transmitting a cancel message of the shared vehicle service related to the first vehicle, and dispatching the first vehicle to the second passenger, and when if the driving for the first passenger has started, transmitting a message of a deliver delay for the lost article to the second user device of the second passenger, and dispatching the first vehicle to the second passenger after the driving for the first passenger has been done.

In addition, performing the dispatch management of the autonomous vehicle further comprises, receiving the call message including the pickup location, transmitting a dispatch message of moving to the pickup location to a vehicle in which a service state is in an available state, changing the service state of the autonomous vehicle to a reserved state from the available state, changing the service state of the autonomous vehicle to a using state from the reserved state according to a transmission of a riding message indicating that the passenger rides on the autonomous vehicle, and changing the service state of the autonomous vehicle to the available state from the using state according to a transmission of a drop-off message indicating the passenger dropping off the autonomous vehicle.

In addition, the service state is displayed by a visual indicator, and the service state is displayed to distinguish at least one of the available state, the reserved state and the using state.

In addition, the method further comprises, when the emergency message is received from the second user device of the second passenger, searching for the first vehicle based on service history data of the second passenger.

In addition, the method further comprises, when the emergency message is received from the first user device of the first passenger, searching for the second passenger among passengers who had used the shared vehicle service of the first vehicle based on service history data of the first vehicle.

In addition, the autonomous vehicle includes a sensor detecting an object inside the autonomous vehicle, and the emergency message is received from the first vehicle based on information obtained through the sensor of the first vehicle.

In addition, the method further comprises, transmitting an inform message to the second passenger upon the first vehicle is dispatched to the second passenger through the emergency message, wherein the inform message is related to a reclaiming cost of the lost article calculated based on location information of the first vehicle and location information of the second passenger.

In addition, the method further comprises, transmitting a reward message according to the emergency message to the first passenger upon the first vehicle is dispatched to the second passenger through the emergency message.

In addition, the reward message is related to a reward available at least in the shared vehicle service.

In addition, the sensor detects whether the passenger rides on the autonomous vehicle with an article, and when the article is recognized after completion of driving of the passenger, the autonomous vehicle transmits the emergency message indicating recognition of the article inside the autonomous vehicle to the server.

In addition, the sensor includes at least one of a RaDAR (Radio Detection And Ranging) device, a RGB camera and a LIDAR (Light Detection And Ranging or Laser Imaging, Detection And Ranging) device.

In addition, the method further comprises, transmitting a reward message according to the emergency message to the first passenger who is received the cancel message as the first vehicle is dispatched to the second passenger.

According to another aspect of the present disclosure, there is provided a non-transitory computer-readable storage medium storing instructions that, when executed by a processor, cause the processor to perform a method for providing a shared vehicle service comprising: performing a dispatch management of an autonomous vehicle by receiving a call message including a pickup location and a drop-off location from a user device and dispatching the autonomous vehicle to the pickup location; dispatching a first vehicle to a first passenger; and receiving an emergency message related to a lost article of a second passenger who had used the shared vehicle service with the first vehicle before the first passenger; wherein, when the emergency message is received, the shared vehicle providing method comprising: when if a driving for the first passenger has not started, cancelling the dispatch of the first vehicle for the first passenger, transmitting a cancel message of the shared vehicle service related to the first vehicle, and dispatching the first vehicle to the second passenger, and when if the driving for the first passenger has started, transmitting a message of a deliver delay for the lost article to the second user device of the second passenger, and dispatching the first vehicle to the second passenger after the driving for the first passenger has been done.

According to another aspect of the present disclosure, a shared vehicle service providing method performed by a server which communicates with a smart device of a passenger and an autonomous vehicle includes managing dispatch of the autonomous vehicle by receiving a first call message including a pickup location and a destination location from the user device and dispatching the autonomous vehicle to the pickup location, transmitting, by a first smart device of a first passenger, the first call message, and when the call message includes a request to store an article of the first passenger, transmitting a dispatch message requesting a first vehicle to move from a first storage, which is the closest storage to the first pickup location, to a first pickup location to the first smart device and the first vehicle, and when the first vehicle arrives at a second storage, transmitting a notification message that the article of the first passenger is stored in the second storage to the first smart device.

The shared vehicle service providing method may further include retransmitting, by the first smart device, the first call message and, when the first call message includes a request to reclaim the article, searching for a second vehicle present at the second storage and dispatching the second vehicle carrying the article of the first passenger to the first passenger.

When the destination location includes only one destination, a storage corresponding to the destination may be determined as the second storage.

When the destination location includes a first destination and a second destination, the first destination may correspond to the destination location of the first passenger, and the second destination may correspond to a destination of the article.

A storage corresponding to the second destination may be determined as the second storage.

The notification message may include a personal authentication means used for storing and reclaiming the article of the first passenger.

The personal authentication means may be set by at least one of a barcode, a quick response (QR) code, radio frequency identification (RFID), a password, a pattern, and biometric recognition.

Each of the first storage and the second storage may include a storage space in which the article may be stored.

The storage space may be set to be secured or unsecured by a personal authentication means based on at least one of a barcode, a QR code, RFID, a password, a pattern, and biometric recognition.

The shared vehicle service providing method may further include, when the article of the first passenger is stored in the second storage through the notification message, transmitting a notification message about a storage fee of the article calculated on the basis of the destination location of the first passenger and a location of the second storage to the first passenger.

The shared vehicle service providing method may further include, when the first call message is retransmitted to request reclaiming of the article of the first passenger, transmitting a notification message about a reclaim cost of the article calculated on the basis of a reclaiming location of the first passenger and a location of the second storage to the first passenger.

The managing of dispatch of the autonomous vehicle may include receiving a call message including a pickup location from the smart device, transmitting a dispatch message requesting a vehicle whose service state is an available state to move to the pickup location to the vehicle, changing the service state of the vehicle from the available state to a reserved state, when a riding message indicating that the passenger is riding in the vehicle is transmitted, changing the service state of the vehicle from the reserved state to an in-use state, and when a drop-off message is transmitted indicating that the passenger disembarks from the vehicle, changing the service state of the vehicle from the in-use state to the available state.

A computer program may be provided to perform the shared vehicle service providing method and be stored in a computer-readable recording medium.

This disclosure describes a shared vehicle service providing system and/or method based on a shared vehicle management server which communicates with a shared vehicle and a user device. Also, this disclosure describes a shared vehicle service providing system and/or method for managing an article of a shared vehicle user on the basis of the shared vehicle management server. Specifically, this disclosure describes a shared vehicle service providing system and/or method in which a shared vehicle management server manages dispatch of a shared vehicle on the basis of data acquired from the shared vehicle and a user device when a problematic situation occurs in a process of using the shared vehicle service. In particular, this disclosure describes a shared vehicle service providing system and/or method in which a shared vehicle management server manages dispatch of a shared vehicle on the basis of data acquired from the shared vehicle and a user device when a user loses some articles in a process of using the shared vehicle service.

A shared vehicle service providing method according to an exemplary embodiment of the present disclosure will be described in detail below.

The shared vehicle service providing method according to the exemplary embodiment of the present disclosure may be performed by a shared vehicle service providing system. The shared vehicle service may be a service for providing a shared vehicle to a plurality of users as shared vehicles are driven on the basis of autonomous-driving technology. Also, the shared vehicle service may be a service for providing the shared vehicle to a plurality of users with high user convenience on the basis of various types of information of the shared vehicle and the users.

FIG. 1 is a diagram illustrating a shared vehicle service providing system according to an exemplary embodiment of the present disclosure. Referring to FIG. 1, a shared vehicle service providing system 1 may include at least one of a user device 10, a shared vehicle 20, and a shared vehicle management server 30. Also, in the shared vehicle service providing system 1, at least two of the user device 10, the shared vehicle 20, and the shared vehicle management server 30 may be controlled through communication therebetween. Also, the shared vehicle service providing system 1 may provide a shared vehicle service to a user through data transmission and reception between the shared vehicle management server 30 and the user device 10 and the shared vehicle 20.

Each element of the shared vehicle service providing system 1 is described in detail below.

The user device 10 may be a device through which user data and/or shared vehicle data may be input, received, transmitted, or stored. The user device 10 may be a device accessing a network and/or the Internet or having a communication function of accessing a network and/or the Internet. The user device 10 may be a communication device capable of transmitting or receiving data by accessing a network through a wireless access device. For example, the user device 10 may be at least one of a cellular phone, a smart phone, a laptop computer, a tablet personal computer (PC), and a netbook. The user device 10 may be configured to be wearable by a user and may be a smart wearable device such as a smart watch, smart glasses, and smart jewelry. In this disclosure, a user device may be referred to as a "shared vehicle service providing terminal" or a "shared vehicle service providing server."

Also, the user device 10 may be a device to which data of the user may be input. The user device 10 may be a device through which location data of the user may be acquired. For example, the user device 10 may include a global positioning system (GPS) and may provide location information to the user on the basis of a location service provided through the GPS. A mobile application (app) may be used in the user device 10. Accordingly, data required for providing the shared vehicle service among pieces of data stored in or acquired by the user device 10 may be transmitted to the shared vehicle management server 30 through the mobile app so that the shared vehicle management server 30 may provide the shared vehicle service to the user.

A configuration of the user device 10 is described in further detail below.

Figure 2:
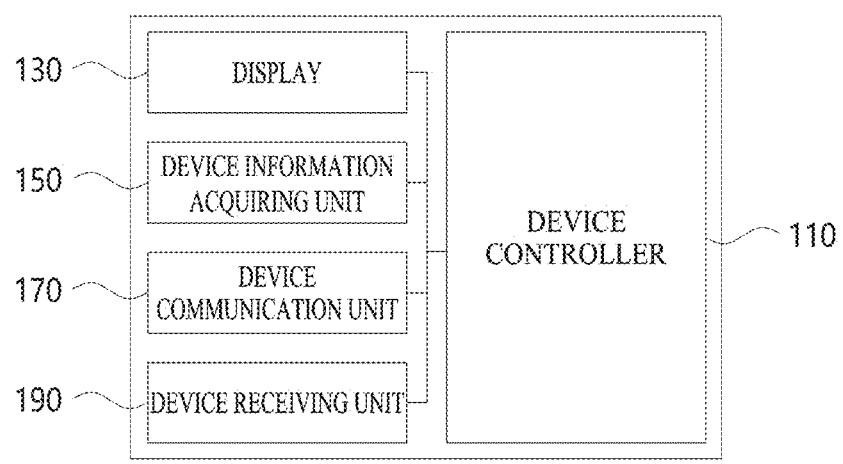
FIG. 2 is a block diagram of a user device according to the exemplary embodiment of the present disclosure.

FIG. 2 is a block diagram of the user device 10 according to the exemplary embodiment of the present disclosure. The user device 10 may include at least one of a device controller 110, a display 130, a device information acquiring unit 150, a device communication unit 170, and a device receiving unit 190. However, the user device 10 is not limited to such a configuration, and another element may be further included or an element may be replaced by another element as necessary.

The device controller 110 may control operation of the user device 10. The device controller 110 may control operation of at least one of the display 130, the device information acquiring unit 150, the device communication unit 170, and the device receiving unit 190.

The device controller 110 may include at least one of a central processing unit (CPU), a random access memory (RAM), a graphics processing unit (GPU), one or more microprocessors, and other electronic parts capable of processing input data according to predetermined logic. For example, the device controller 110 may load process data and the like for a shared vehicle management service, which will be described below, between any two of the user device 10, the shared vehicle 20, and the shared vehicle management server 30 onto the RAM and perform various types of processing according to a loaded program.

The display 130 may display the shared vehicle management service provided to the user device 10. Information to be displayed to the user through the display 130 may be controlled by the controller 110. The display 130 may display at least one of information stored in the user device 10 in advance, information input to the user device 10 by the user, information acquired from the shared vehicle 20, and information acquired from the shared vehicle management server 30.

Also, the display 130 may display information required to be input by the user. The display 130 may display the content of the shared vehicle service to support the shared vehicle service. For example, the display 130 may display the location of the user device 10 and the location of the shared vehicle 20. The display 130 may display information on a destination specified by the user's manipulation, particularly, location information, a travel path, a travel time, or the like of the destination.

Further, the display 130 may provide icons, buttons, images, etc. which may be manipulated by the user to determine the user's intention of receiving the shared vehicle service. For example, when the user contacts or taps at least some icons displayed on the display 130 with his or her finger, the display 130 may display information corresponding to the user's intention of manipulation.

The device information acquiring unit 150 may acquire information from at least one of the user device 10, the shared vehicle 20, and the shared vehicle management server 30. The device information acquiring unit 150 may select and acquire information suited to the user's intention from at least one of the user device 10, the shared vehicle 20, and the shared vehicle management server 30.

As an example, the device information acquiring unit 150 may acquire user information received through the device receiving unit 190. The user information may be location information, input information, preference information, article information, companion information, service use information, etc. of the user.

In particular, the location information of the user may include a pickup location of the shared vehicle service, and the pickup location may be determined on the basis of the location information and/or the input information of the user. Also, the location information of the user may be determined on the basis of location information, such as GPS information, of the user device 10. The location information of the user may be changed according to the input information of the user.

The input information of the user may be information required to be input so that the user may receive the shared vehicle service. For example, the input information of the user may be personal information, payment information, pickup and drop-off location information, etc. of the user.

When the user loads an article to use the shared vehicle service, the article information of the user may include information on the article. For example, the article information of the user may include information on the state, type, weight, size, and inside of the article. The article information of the user may include security information of the article as necessary, and the security information may be a password, RFID information, biometric recognition information, and the like. The aforementioned article may be an object which is continuously carried by the user, such as a purse or a cellular phone, or an object which is easy to store such as a carrier or a bag.

The service use information of the user may include information on the user's history of using the shared vehicle service. For example, the user may request the shared vehicle service on the basis of an existing history of using the shared vehicle service. More specifically, the service use information of the user may include information such as a time, a place, and a purpose for which the user has used the shared vehicle service, a one way or return trip, a travel distance, a fee, and the like. Also, the service use information of the user may include information, such as user satisfaction, suggestions, and comments, that is generated when the shared vehicle service is used.

The preference information of the user may include information on the user's preference in receiving the shared vehicle service. For example, the preference information of the user may include preference information for the state, type, cleanness, design, whether to ride together, etc. of a vehicle provided in the shared vehicle service.

The companion information of the user may include information on a companion when the user uses the shared vehicle service together with the companion. For example, the companion information of the user may include how many companions are there, how old the companion is, whether the companion has an article, and the like.

As another example, the device information acquiring unit 150 may acquire shared vehicle information received through the device receiving unit 190. The shared vehicle information may include information on the type, state of use, and location information of a vehicle provided in the shared vehicle service.

In particular, the location information of the shared vehicle may be determined on the basis of location information, such as GPS information, of the shared vehicle 20. The type information of the shared vehicle may include a list of vehicles that may be provided in the shared vehicle service, and the list may be selected and provided on the basis of at least one of an available region and an available time of the shared vehicle service. The state-of-use information of the shared vehicle may be classified into available, reserved, or in-use by the condition information of the shared vehicle.

As another example, the device information acquiring unit 150 may acquire information which is provided by the shared vehicle management server 30 and received through the device receiving unit 190. The information provided by the shared vehicle management server 30 may include vehicle path information, traffic information, etc. provided in the shared vehicle service.

In particular, the vehicle path information provided in the shared vehicle service may be provided on the basis of the location information of the user and the location information of the shared vehicle. For example, the path information may be provided on the basis of an index, such as the shortest path or the shortest time according to the user's selection. Also, the traffic information provided in the shared vehicle service may include information on traffic situations which are reflected on the path information. The traffic information may include real-time information on traffic situations occurring between the pickup location and the drop-off location when the user uses the shared vehicle service.

The device communication unit 170 may perform communication between at least two of the user device 10, the shared vehicle 20, and the shared vehicle management server 30. The device communication unit 170 may be implemented by a processor, which executes a communication interface, mainly on the basis of a memory and a storage device.

For example, the device communication unit 170 may cause a call message or vehicle request information input from the user device 10 to be transmitted to the shared vehicle management server 30. Also, the device communication unit 170 may cause information (a vehicle type, a vehicle license number, a vehicle color, etc.) on a shared vehicle dispatched by the shared vehicle management server 30 to be received. Further, the device communication unit 170 may cause use information of the shared vehicle provided by the shared vehicle management server 30 to be transmitted to the shared vehicle management server 30.

In addition, the device communication unit 170 may cause security information required for the user to use the shared vehicle management service to be received from the shared vehicle management server 30. The security information may be riding security information (e.g., door unlocking) for using the shared vehicle 20. Also, the security information may be article-related security information for accessing the trunk of the shared vehicle 20.

The device receiving unit 190 may receive user information input to the user device 10. The information received through the device receiving unit 190 may be provided to the device information acquiring unit 150. Also, the device receiving unit 190 may receive information received by the device communication unit 170. The device receiving unit 190 may be implemented by a processor, which executes at least one of a user interface and a communication interface, mainly on the basis of a memory and a storage device.

A configuration of the shared vehicle 20 is described in further detail below.

The shared vehicle 20 may be an arbitrary vehicle which may be shared among a plurality of users. The shared vehicle 20 may be a vehicle provided by a certain operator or operation company and may be used by at least some of the plurality of users for a certain time and/or distance with a certain fee. In particular, the shared vehicle 20 may be an autonomous vehicle which may be shared among the plurality of users.

Figure 3:
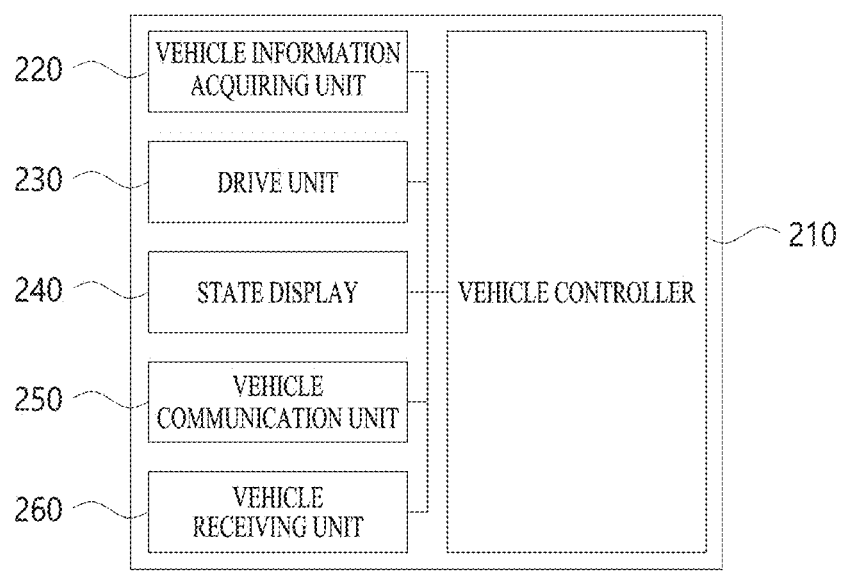
FIG. 3 is a block diagram of a shared vehicle according to the exemplary embodiment of the present disclosure.

FIG. 3 is a block diagram of the shared vehicle 20 according to the exemplary embodiment of the present disclosure. The shared vehicle 20 may include at least one of a vehicle controller 210, a vehicle information acquiring unit 220, a drive unit 230, a state display 240, a vehicle communication unit 250, and a vehicle receiving unit 260. However, the vehicle management server 30 is not limited to the configuration, and another element may be further included or an element may be replaced by another element as necessary.

The vehicle controller 210 may control operation of the shared vehicle 20. The vehicle controller 210 may control operation of at least one of the vehicle information acquiring unit 220, the drive unit 230, the state display 240, the vehicle communication unit 250, and the vehicle receiving unit 260.

The vehicle controller 210 may include at least one of a CPU, a RAM, a GPU, one or more microprocessors, and other electronic parts capable of processing input data according to predetermined logic. For example, the vehicle controller 210 may load process data and the like for the shared vehicle management service, which will be described below, between any two of the user device 10, the shared vehicle 20, and the shared vehicle management server 30 into the RAM and perform various types of processing according to a loaded program.

The vehicle information acquiring unit 220 may acquire information from at least one of the user device 10, the shared vehicle 20, and the shared vehicle management server 30. The vehicle information acquiring unit 220 may select and acquire information corresponding to the user's intention from at least one of the user device 10, the shared vehicle and the shared vehicle management server 30.

As an example, the vehicle information acquiring unit 220 may acquire user information received through the vehicle receiving unit 260. The user information may be information provided by the user device 10 or information provided by the shared vehicle management server 30. The user information may be acquired on the basis of a call message which is provided to the shared vehicle management server 30 by the user device 10.

In particular, the user information may include pickup and drop-off information, article information, path information, etc. of the user included in the call message. The user information may include path and time information between the pickup location acquired on the basis of the call message and a current location of the shared vehicle. As described above, the user information may include location information such as GPS information.

As another example, the vehicle information acquiring unit 220 may acquire intra-vehicle information received by the vehicle receiving unit 260. The intra-vehicle information may include whether a user is riding in the shared vehicle 20, whether the user has loaded an article, a state of the shared vehicle 20, travel information of the shared vehicle 20, and the like. The travel information of the shared vehicle 20 may be acquired on the basis of information of the GPS and the like installed in the shared vehicle 20.

Figure 4:
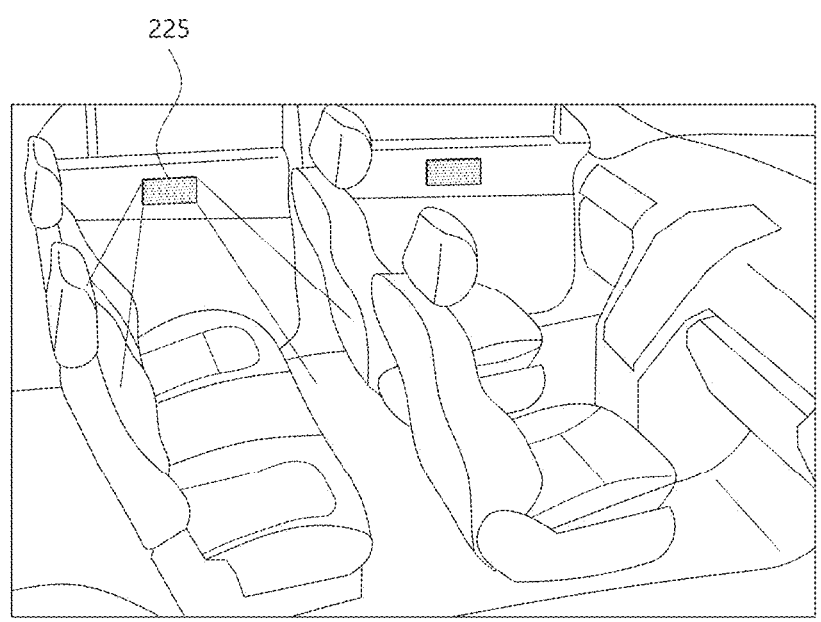
FIG. 4 is a view showing an intra-vehicle sensor of a shared vehicle according to the exemplary embodiment of the present disclosure.

FIG. 4 is a view showing an intra-vehicle sensor of a shared vehicle according to the exemplary embodiment of the present disclosure. Referring to FIG. 4, the intra-vehicle information may be acquired on the basis of an intra-vehicle sensor device 225. The intra-vehicle sensor device 225 may be a sensor system installed in a vehicle. The intra-vehicle sensor device 225 may include an object recognition system which employs an optical sensor. For example, the intra-vehicle sensor device 225 may employ an object recognition device, such as a radio detection and ranging (RaDAR) device, a red-green-blue (RGB) camera, or a depth camera, or a multimodal technique for recognizing an object through a light detection and ranging or laser imaging, detection, and ranging (LIDAR) device. For example, the intra-vehicle sensor device 225 may be positioned in at least a partial area of the inside of the vehicle. The intra-vehicle sensor device 225 may be placed at a position appropriate for sensing the inside of the vehicle overall. For example, the intra-vehicle sensor device 225 may be installed on each of both side surfaces of the vehicle.

In particular, the intra-vehicle information may include the user's use information of the shared vehicle 20 after the shared vehicle 20 arrives at the pickup location of the user on the basis of the call message provided by the shared vehicle management server 30. Also, the intra-vehicle information may include whether the user has loaded an article in the shared vehicle 20, and it may be checked through the intra-vehicle information whether the article is loaded or unloaded in connection with the user's getting in or out of the shared vehicle 20.

As another example, the vehicle information acquiring unit 220 may acquire external information received through the vehicle receiving unit 260. The external information may include traffic information, emergency information, and the like. The traffic information may be received through the shared vehicle management server 30 and may include traffic situation information related to a travel path of the shared vehicle 20. The emergency information may include information that is taken into consideration first when the shared vehicle 20 provides the shared vehicle service. For example, the emergency information may include urgent information, such as a state of the user, a state of the shared vehicle 20, and occurrence of a traffic accident.

The drive unit 230 may operate the shared vehicle 20. The drive unit 230 may operate to be switchable among various operating modes. The drive unit 230 may operate the shared vehicle 20 in a manual mode, a semi-autonomous mode, or an autonomous mode. In the manual mode, the shared vehicle 20 may be operated by a driver like a general vehicle. The semi-autonomous mode or the autonomous mode may be available when the drive unit 230 includes an autonomous-driving module. However, in the semi-autonomous mode, the drive unit 230 does not operate the shared vehicle 20 fully autonomously. The semi-autonomous mode may include some autonomous characteristics, such as cruise control and lane keeping, and also requires a driver's manipulation. In the autonomous mode, a vehicle is driven by the autonomous-driving module without a driver's intervention.

When the drive unit 230 operates in the autonomous mode, the drive unit 230 may be implemented as a computer-readable program which implements various processes. The autonomous-driving module may drive on the basis of information provided by the shared vehicle management server 30. In particular, the autonomous-driving module may include a machine learning algorithm, such as artificial intelligence (AI), to perform autonomous driving by integrating information provided by the user device 10, the shared vehicle 20, and the shared vehicle management server 30. The machine learning algorithm may conduct an analysis through AI which is trained with a plurality of pieces of data in advance. For example, the scale-invariant feature transform (SIFT), a histogram of oriented gradient (HOG), Haar features, Ferns, a local binary pattern (LBP), the modified census transform (MCT), a neural network (NN), a deep neural network (DNN), a convolutional neural network (CNN), etc. may be used.

The state display 240 may be an element for externally or internally displaying a service-use state of the shared vehicle 20. The state display 240 may be an element positioned on an external side of the shared vehicle 20 so that the service-use state of the shared vehicle 20 may be recognized from the outside of the vehicle. The state display 240 may be an element placed in the shared vehicle 20 so that a passenger may recognize the service-use state of the vehicle in the vehicle. Also, the state display 240 may be an element displayed in a form which may be recognized by a user or from the outside of the shared vehicle 20 on the basis of a visual element, an auditory element, or the like.

Figure 5:
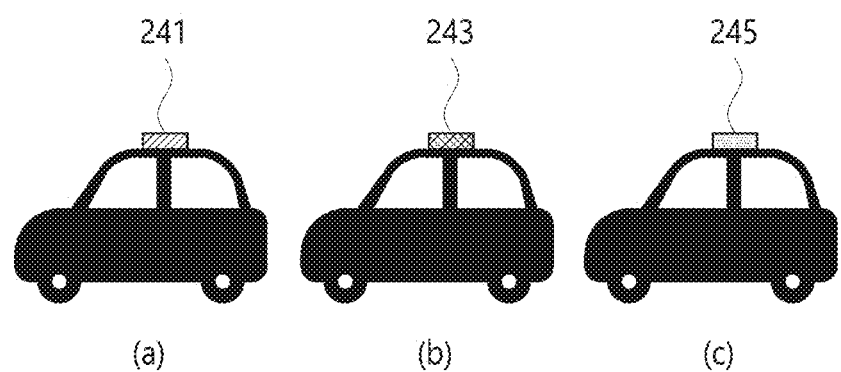
FIG. 5 is a set of diagrams showing an element for displaying a state of a shared vehicle according to the exemplary embodiment of the present disclosure.

FIG. 5 is a set of diagrams showing an element for displaying a state of a shared vehicle according to the exemplary embodiment of the present disclosure. Referring to FIG. 5, in the shared vehicle, the state display 240 may be installed at a position to be externally recognized, and the state display 240 may be set as shown in FIG. 5A, 5B, or 5C depending on the service-use state of the shared vehicle 20.

The aforementioned service-use state of the shared vehicle 20 may denote information related to service providing of the shared vehicle 20. The service-use state of the shared vehicle 20 may denote a service stage of the shared vehicle 20 which is currently being provided. The service-use state of the shared vehicle 20 may be classified according to the provided service stage of the shared vehicle 20, and the service stage may include a plurality of stages. As the service stage, the service-use state of the shared vehicle 20 may be generally classified into a first state in which the service is not currently provided, a second state in which the service is scheduled to be provided, and a third state in which the service is provided.

The first state may correspond to FIG. 5A, indicating an available state in which the service is not started yet. The second state may correspond to FIG. 5B, indicating a reserved state in which the service will be provided to a user. The third state may correspond to FIG. 5C, indicating an in-use state in which the service is provided. Indications displayed by the state display 240 may be classified as available 241, reserved 243, and in-use 245, but the indications are not limited to FIG. 5 as long as they are distinguishable from each other.

The vehicle communication unit 250 may perform communication between at least two of the user device 10, the shared vehicle 20, and the shared vehicle management server 30. The vehicle communication unit 250 may be implemented by a processor, which executes a communication interface, mainly on the basis of a memory and a storage device.

For example, the vehicle communication unit 250 may cause a call message or vehicle request information input from the user device 10 to be transmitted to the shared vehicle management server 30. Also, the vehicle communication unit 250 may cause vehicle information (a vehicle type, a vehicle license number, a vehicle color, etc.) of the shared vehicle 20 dispatched by the shared vehicle management server 30 to be transmitted. Further, the vehicle communication unit 250 may cause use information of the shared vehicle 20 to be transmitted to the shared vehicle management server 30.

In addition, the vehicle communication unit 250 may cause security information required for a user to use the shared vehicle management service to be transmitted to the shared vehicle management server 30. The security information may be riding security information (e.g., door unlocking) for using the shared vehicle 20. The security information may be article-related security information for accessing the trunk of the shared vehicle 20. When a problematic situation occurs in the shared vehicle 20, the security information may be information which is provided only to a user related to the problematic situation.

The vehicle receiving unit 260 may receive user information, vehicle information, etc. input to the shared vehicle 20. The information received by the vehicle receiving unit 260 may be provided to the vehicle information acquiring unit 220. Also, the vehicle receiving unit 260 may receive information received through the vehicle communication unit 250. The vehicle receiving unit 260 may be implemented by a processor, which executes at least one of a user interface and a communication interface, mainly on the basis of a memory and a storage device.

A configuration of the shared vehicle management server 30 is described in further detail below.

Figure 6:
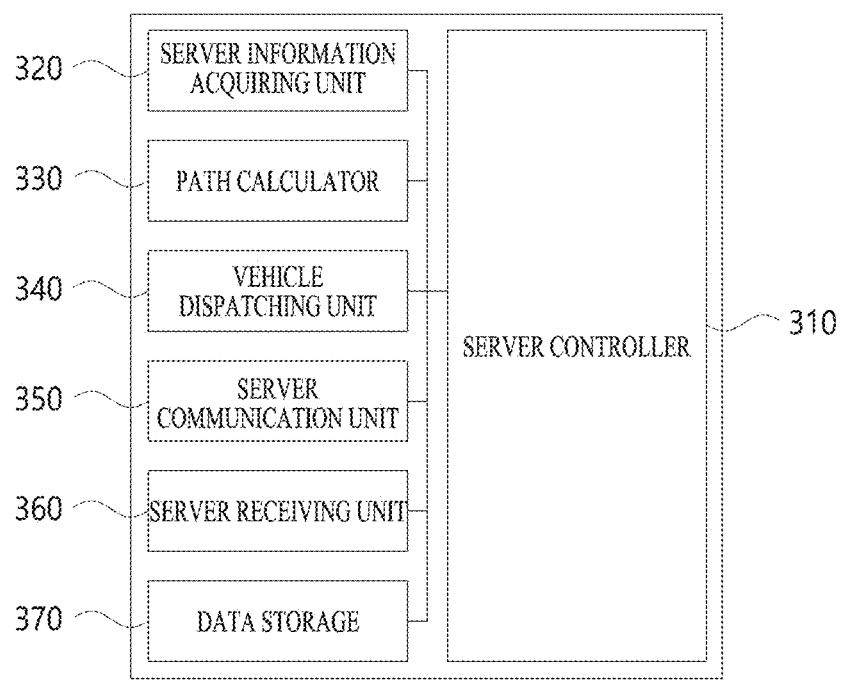
FIG. 6 is a block diagram of a shared vehicle management server according to the exemplary embodiment of the present disclosure.

FIG. 6 is a block diagram of the shared vehicle management server 30 according to the exemplary embodiment of the present disclosure. Referring to FIG. 6, the shared vehicle management server 30 may include at least one of a server controller 310, a server information acquiring unit 320, a path calculator 330, a vehicle dispatching unit 340, a server communication unit 350, a server receiving unit 360, and a data storage 370. However, the vehicle management server 30 is not limited to the configuration, and another element may be further included or an element may be replaced by another element as necessary.

The server controller 310 may control operation of the shared vehicle management server 30. The server controller 310 may control operation of any one of the server information acquiring unit 320, the path calculator 330, the vehicle dispatching unit 340, the server communication unit 350, the server receiving unit 360, and the data storage 370.

The server controller 310 may include at least one of a CPU, a RAM, a GPU, one or more microprocessors, and other electronic parts capable of processing input data according to predetermined logic. For example, the server controller 310 may load process data and the like for the shared vehicle management service, which will be described below, between any two of the user device 10, the shared vehicle 20, and the shared vehicle management server 30 into the RAM and perform various types of processing according to a loaded program.

The server information acquiring unit 320 may acquire information from at least one of the user device 10, the shared vehicle 20, and the shared vehicle management server 30. The server information acquiring unit 320 may select and acquire information corresponding to the user's intention from at least one of the user device 10, the shared vehicle and the shared vehicle management server 30.

For example, the server information acquiring unit 320 may acquire information of the shared vehicle 20 received through the server receiving unit 360 and information provided by the user device 10. The server information acquiring unit 320 may acquire information which is acquired through the server communication unit 350 and received by the server receiving unit 360.

For example, the server information acquiring unit 320 may acquire travel information, vehicle state information, vehicle location information, etc. of the shared vehicle as the information of the shared vehicle 20. In particular, the server information acquiring unit 320 may acquire information on a location of the shared vehicle 20 on the basis of location information, such as GPS information, of the shared vehicle 20. Also, the server information acquiring unit 320 may acquire information on a vehicle state from the state display 240 of the shared vehicle 20.

For example, the server information acquiring unit 320 may acquire location information, pickup and drop-off information, article information, preference information, etc. of the user as user information of the user device 10. The user information may be the same as described above. In particular, the server information acquiring unit 320 may acquire the information on a location of the user on the basis of location information, such as GPS information, of the user device 10. Also, the server information acquiring unit 320 may acquire at least one of the pickup and drop-off information and the article information on the basis of user information input to the user device 10.

For example, the server information acquiring unit 320 may acquire external information. As the external information, road information, traffic information, weather information, etc. may be acquired from an external database. The road information, the traffic information, and the weather information may be updated and acquired in real time as the external information.

The path calculator 330 may calculate a path on the basis of the location information of the user and the location information of the shared vehicle 20 acquired from the server information acquiring unit 320. The path calculator 330 may calculate a path on the basis of a certain criterion, which may include a shortest path, a shortest time, a lowest cost, and the like. The path calculator 330 may calculate a path between the location information of the user and the location information of the shared vehicle 20. Also, the path calculator 330 may calculate a path between the pickup location and the drop-off location included in the location information of the user. Further, the path calculator 330 may calculate a path on the basis of the external information acquired from the server information acquiring unit 320. In addition, the path calculator 330 may integrate the location information of the shared vehicle 20, the location information of the user, and the external information to calculate a path according to the certain criterion.

The path calculator 330 may perform the path calculation with a certain computer program. The path calculator 330 may perform the path calculation with an algorithm of the certain computer program. Also, the path calculator 330 may perform the path calculation through AI. The path calculator 330 may perform the path calculation through AI which is trained with a plurality of pieces of data in advance. In the path calculator 330, the SIFT, a HOG, Haar features, Ferns, an LBP, the MCT, an NN, a DNN, a CNN, etc. may be used.

The vehicle dispatching unit 340 may provide vehicle dispatch information for the user to the shared vehicle 20 on the basis of the information acquired from the server information acquiring unit 320 and the path calculated by the path calculator 330. Also, the vehicle dispatching unit 340 may provide dispatch information for the user to the shared vehicle 20 on the basis of information based on at least one of the user information, the location information of the shared vehicle 20, and the external information acquired from the server information acquiring unit 320 and the path information calculated by the path calculator 330.

The vehicle dispatching unit 340 may provide the dispatch information for the user regarding the shared vehicle 20, and the dispatch information may be provided regarding any one of a plurality of shared vehicles 20 according to a certain criterion. The certain criterion may be information set or input by the user and may be a shortest path, a shortest time, a lowest cost, user preference, and the like.

The server communication unit 350 may perform communication between at least two of the user device 10, the shared vehicle 20, and the shared vehicle management server 30. The server communication unit 350 may be implemented by a processor, which executes a communication interface, mainly on the basis of a memory and a storage device.

For example, the server communication unit 350 may cause a call message or vehicle request information input from the user device 10 to be received in the shared vehicle management server 30. Also, the server communication unit 350 may cause vehicle information (a vehicle type, a vehicle license number, a vehicle color, etc.) of the dispatched shared vehicle 20 to be received in the shared vehicle management server 30. Further, the server communication unit 350 may cause use information of the shared vehicle 20 provided by the shared vehicle management server 30 to be received in the shared vehicle management server 30.

In addition, the server communication unit 350 may cause security information required for a user to use the shared vehicle management service to be transmitted from the shared vehicle management server 30. The security information may be riding security information (e.g., door unlocking) for using the shared vehicle 20. Also, the security information may be article-related security information for accessing the trunk of the shared vehicle 20.

The server receiving unit 360 may receive information received in the shared vehicle management server 30. The information received by the server receiving unit 360 may be provided to the server information acquiring unit 320. Also, the server receiving unit 360 may receive information received through the server communication unit 350. The server receiving unit 360 may be implemented by a processor, which executes at least one of a user interface and a communication interface, mainly on the basis of a memory and a storage device.

The data storage 370 may store data transmitted and received between the user device 10, the shared vehicle 20, and the shared vehicle management server 30. The data storage 370 may also store geographical data (map data), registered shared vehicle data, etc. as the external data. The data storage 370 may also store data on a use history of the user device 10 through which the shared vehicle service is used. The data storage 370 may also store data on a path history, a providing history, etc. of the shared vehicle 20 providing the shared vehicle service. The data storage 370 may also store data on a dispatch history, a computation history, etc. for the shared vehicle management server 30 to provide the shared vehicle service.

The shared vehicle service performed by the shared vehicle service providing system 1 including the user device 10, the shared vehicle 20, and the shared vehicle management server 30 is described in detail below.

Figure 7:
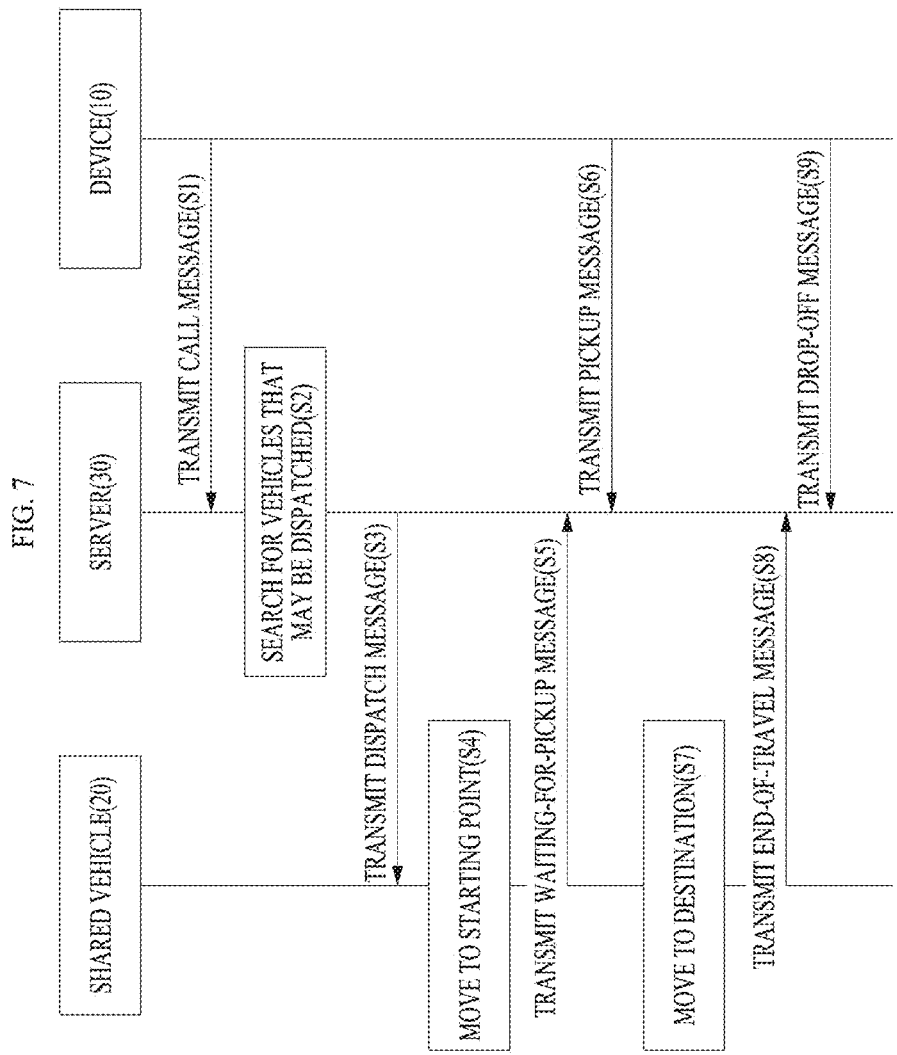
FIG. 7 is a sequence diagram of a shared vehicle service providing method performed by a shared vehicle, a server, and a device according to the exemplary embodiment of the present disclosure.
Figure 8:
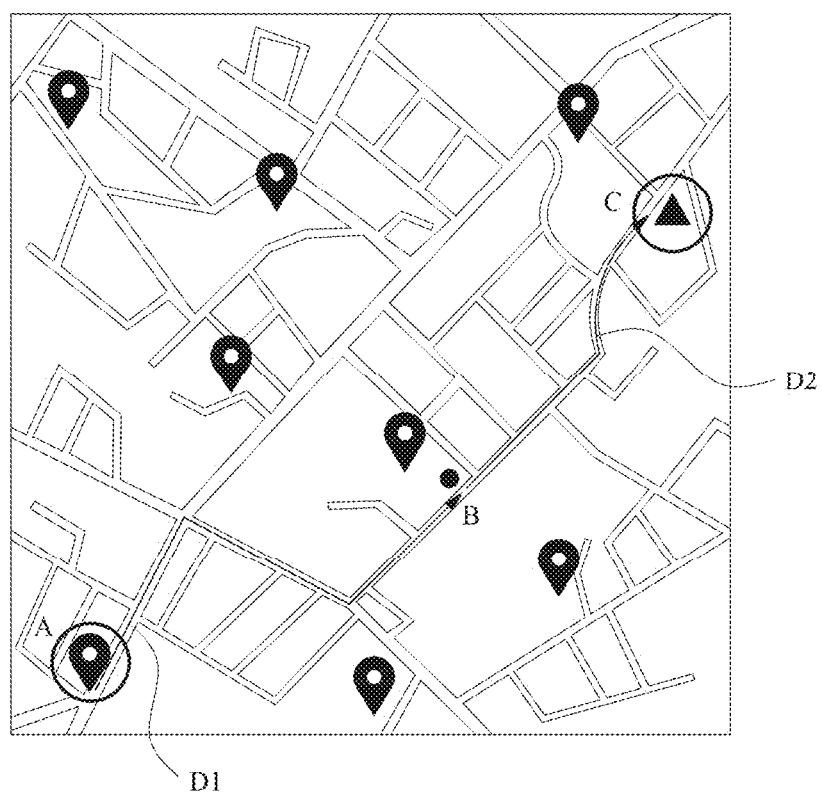
FIG. 8 is a diagram showing a vehicle travel path generated with the use of a shared vehicle service according to the exemplary embodiment of the present disclosure.

FIG. 7 is a sequence diagram of a shared vehicle service providing method performed by a shared vehicle, a server, and a device according to the exemplary embodiment of the present disclosure. FIG. 8 is a diagram showing a vehicle travel path generated with the use of a shared vehicle service according to the exemplary embodiment of the present disclosure.

Referring to FIGS. 7 and 8, a shared vehicle service providing method performed by a shared vehicle service providing system including at least one of a device 10, a shared vehicle 20, and a server 30 may provide a shared vehicle service through certain operations.

Referring to FIG. 8, A denotes the location of the shared vehicle 20, B denotes a pickup location or a starting point of a user, and C denotes a drop-off location or a destination of the user. Also, referring to FIG. 8, the path between A which is the location of the shared vehicle 20 and B which is the pickup location of the user is referred to as a first path D1, and the path between B which is the pickup location of the user and C which is the drop-off location of the user is referred to as a second path D2.

According to the shared vehicle service providing method, a shared vehicle service may be provided so that a call message is transmitted from the device 10 to the server 30 (S1). The call message transmission S1 may be an operation in which the device 10 provides a call message for requesting the server 30 to dispatch the shared vehicle 20. In this case, the call message may be a signal for the device 10 to request the server 30 to dispatch the shared vehicle 20. As described above, the call message may include a transmission time at which the call message is transmitted from the device 10, a requested dispatch time of the user, and information on the pickup location B, the drop-off location C, and the like.

According to the shared vehicle service providing method, the shared vehicle service may be provided so that the server 30 searches for vehicles which may be dispatched on the basis of transmission S1 of the call message (S2). The search S2 for vehicles that may be dispatched may be an operation in which the server 30 searches for vehicles that may be dispatched on the basis of shared vehicle information data stored in the data storage 370. The search S2 for vehicles that may be dispatched may be an operation in which the server 30 searches for vehicles that may be dispatched on the basis of the shared vehicle information data stored in the data storage 370 and the information included in the call message. Here, a shared vehicle may be determined to be available for dispatch when the current location A of the shared vehicle is a certain distance or less away from the pickup location B of the user of the device 10, the service-use state of the shared vehicle is the available state, or the like.

According to the shared vehicle service providing method, the shared vehicle service may be provided so that the server 30 transmits a dispatch message to the shared vehicle 20 which is found in the search S2 for vehicles that may be dispatched (S3). The transmission S3 of the dispatch message may be an operation in which the server 30 provides a dispatch message for requesting dispatch of the shared vehicle 20 to the shared vehicle 20. Here, the dispatch message may be a signal for the server 30 to request dispatch of the shared vehicle 20. As described above, the dispatch message may include the transmission time at which the call message is transmitted from the device 10, the requested dispatch time of the user of the device 10, and the information on the pickup location B, the drop-off location C, and the like.

According to the shared vehicle service providing method, the shared vehicle service may be provided so that the shared vehicle 20 moves to the starting point according to the transmission S3 of the dispatch message (S4). The vehicle movement S4 to the starting point may be an operation in which the shared vehicle 20 moves to the pickup location of the user of the device 10 according to the dispatch message. The vehicle movement S4 to the starting point may be an operation in which the shared vehicle 20 moves to the pickup location B of the user of the device 10 along the first path D1 according to the dispatch message. The first path D1 may be a path calculated by the path calculator 330 according to the certain criterion.

According to the shared vehicle service providing method, the shared vehicle service may be provided so that the shared vehicle 20 transmits a waiting-for-pickup message to the server 30 (S5). The transmission S5 of the waiting-for-pickup message may be an operation in which the shared vehicle 20 notifies the server 30 that the vehicle movement S4 to the starting point has been performed according to the dispatch message of the server 30. The waiting-for-pickup message may be a message for notifying the server 30 that the shared vehicle 20 is waiting at the pickup location of the user of the device 10 included in the dispatch message.

According to the shared vehicle service providing method, the shared vehicle service may be provided so that the device 10 transmits a pickup message to the server 30 when the user of the device 10 rides in the shared vehicle (S6). The transmission S6 of the pickup message may be an operation in which the user of the device 10 notifies the server 30 that the user is safely and smoothly using the service with the shared vehicle 20.

According to the shared vehicle service providing method, the shared vehicle service may be provided so that the shared vehicle 20 moves to the destination requested by the user of the device 10 (S7). The vehicle movement S7 to the destination may be an operation in which the shared vehicle 20 moves to the drop-off location of the user of the device 10 according to the pickup message. The vehicle movement S7 to the destination may be an operation in which the shared vehicle 20 moves to the drop-off location C of the user of the device 10 along the second path D2 according to the pickup message. The second path D2 may be a path calculated by the path calculator 330 of the shared vehicle management server 30 according to the certain criterion.

According to the shared vehicle service providing method, the shared vehicle service may be provided so that the shared vehicle 20 transmits an end-of-travel message to the server (S8). The transmission S8 of an end-of-travel message may be an operation in which the shared vehicle 20 notifies the server 30 that the vehicle movement S7 to the destination has been performed according to the dispatch message of the server 30. The end-of-travel message may be a message for notifying the server 30 that the shared vehicle 20 has arrived at the drop-off location of the user of the device 10 included in the dispatch message.

According to the shared vehicle service providing method, the shared vehicle service may be provided so that the device 10 transmits a drop-off message to the server (S9) when the user of the device 10 gets out of the shared vehicle 20. The transmission S9 of the drop-off message may be an operation in which the user of the device 10 notifies the server 30 that the user has been safely and smoothly used the service with the shared vehicle 20.

Figure 9:
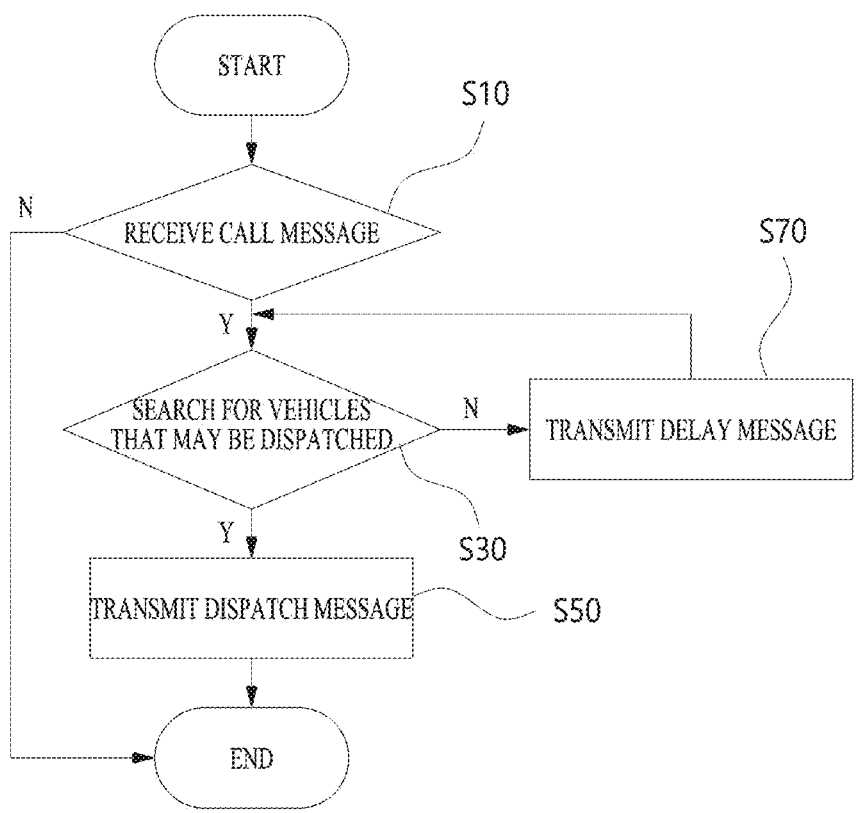
FIG. 9 is a flowchart of the shared vehicle service providing method performed by a shared vehicle management server according to the exemplary embodiment of the present disclosure.

FIG. 9 is a flowchart of a shared vehicle management service providing method performed by a shared vehicle management server according to the exemplary embodiment of the present disclosure. Referring to FIG. 9, the shared vehicle management service may be provided through a shared vehicle management process including at least one of an operation S10 of receiving a call message, an operation S30 of searching for an available vehicle, an operation S50 of transmitting a dispatch message, and an operation S70 of transmitting a delay message. However, the shared vehicle management process is not limited to the above operations, and another operation may be further included or an operation thereof may be replaced by another operation as necessary.

Referring to FIGS. 1 to 9, the shared vehicle management process may include the call message receiving operation S10 in which the call message input through the user device 10 is received by the shared vehicle management server 30. The call message may include the user information, such as the location information and the preference information of the user, and the user information may be the same as described above. In the reception S10 of a call message, the call message may be received, and the call message may include the pickup and drop-off information of the user, which may include information on the pickup location B and the drop-off location C of the user.

In the shared vehicle management process, with the reception S10 of the call message, an available vehicle may be searched for on the basis of the user information S30. The search S30 for an available vehicle may be an operation in which a vehicle corresponding to the user information received in the reception of a call message is searched for among the plurality of shared vehicles 20. The search S30 for an available vehicle may be an operation in which a vehicle is searched for on the basis of the user information received in the reception S10 of a call message and vehicle information acquired from the shared vehicle 20. As described above, the vehicle information may include vehicle state information, vehicle use information, path information, etc. acquired from the shared vehicle 20. Also, the vehicle information may include path information which is calculated on the basis of the location A of the shared vehicle 20 according to the certain criterion. The available vehicle may denote a case in which at least any one of the plurality of shared vehicles 20 corresponds to the call message received in the reception S10 of a call message and the certain criterion.

The shared vehicle management process may include the dispatch message transmitting operation S50 in which when an available vehicle is searched for in the search S30 for an available vehicle, the shared vehicle management server 30 transmits a dispatch message to the shared vehicle 20. The dispatch message transmitting operation S50 may be an operation in which the shared vehicle management server 30 transmits a dispatch message generated on the basis of the pickup and drop-off information received in the reception S10 of a call message and the like to the shared vehicle 20. Also, in the dispatch message transmitting operation S50, when the shared vehicle 20 receives the dispatch message from the shared vehicle management server 30, the shared vehicle 20 may transmit an acknowledgement message of the dispatch message to the user device 10.

The shared vehicle management process may include the delay message transmitting operation S70 in which when no available vehicle is found in the search S30 for an available vehicle, the shared vehicle management server 30 transmits a delay message to the user device 10. The transmission S70 of a delay message may be an operation of transmitting a message that the shared vehicle service is delayed because no corresponding vehicle is found in the search S30 for an available vehicle. The transmission S70 of a delay message may be an operation of transmitting a message including a delay time, the degree of delay, a delay reason, etc. on the basis of information found in the search S30 for an available vehicle. Also, in the transmission S70 of a delay message, the delay message may be transmitted to the user device 10, and then the search S30 for an available vehicle may be performed so that the search may be continuously performed to provide the shared vehicle service in the shared vehicle management process.

Consequently, the shared vehicle management process may provide a shared vehicle service suited to a user on the basis of at least one of the user device 10, the shared vehicle 20, and the shared vehicle management server 30. Also, the shared vehicle management process may improve a user's service satisfaction and convenience by providing a shared vehicle best suited to a call message of the user on the basis of information provided by at least one of the user device 10, the shared vehicle 20, and the shared vehicle management server 30.

The shared vehicle service which is performed when an emergency call is generated or transmitted is described in detail below according to the exemplary embodiment of the present disclosure.

The emergency call may include emergency information in the shared vehicle service. The emergency information may include health information of a user, state information of a shared vehicle, dangerousness information of surroundings, and the like. Also, the emergency information may include information on the user's article in the shared vehicle. In particular, the emergency information may include loss information of the user's article in the shared vehicle. The loss information may denote a case in which the user who uses the shared vehicle service forgets his or her article in the shared vehicle and gets out of the shared vehicle. For example, in the shared vehicle service according to the exemplary embodiment of the present disclosure, an emergency call including the loss information may be transmitted to the shared vehicle management server 30.

The article may be an object which may be loaded into a certain storage such as the trunk of the shared vehicle. Also, the article may be an object that the user puts in the shared vehicle 20 when riding in the shared vehicle 20. The article may be anything having a size, weight, etc. that may be loaded in the shared vehicle 20 together with the user.

Referring to FIGS. 1 to 9, the emergency call of the shared vehicle service according to the exemplary embodiment of the present disclosure may be transmitted from at least one of the user device 10, the shared vehicle 20, and the shared vehicle management server 30. The emergency call may also be transmitted due to the user's request input to the user device 10. The emergency call may also be transmitted on the basis of intra-vehicle information acquired from the intra-vehicle sensor device 225 of the shared vehicle 20.

As an example, when the article is determined to be lost after the user of the shared vehicle service gets out of the shared vehicle 20, the emergency call may be transmitted from the user device 10 to the shared vehicle management server 30. In this case, the emergency call may be transmitted by the user of the shared vehicle service when the shared vehicle 20 is not used by another user or is reserved by another user after the user has used the shared vehicle service of the shared vehicle 20. Also, even when the shared vehicle 20 is used by another user after the user has used the shared vehicle service of the shared vehicle 20, the emergency call of the user may be transmitted to the shared vehicle management server 30.

As another example, a user who first uses the shared vehicle 20 may be assumed to be a first user, and a user who uses the shared vehicle 20 subsequent to the first user may be assumed to be a second user. After the first user finishes using the shared vehicle service of the shared vehicle 20, the second user may find the article loaded in the shared vehicle 20. In this case, the second user may transmit the emergency call about the article to the shared vehicle management server 30.

As another example, the shared vehicle 20 may transmit the emergency call to the shared vehicle management server 30 on the basis of intra-vehicle information acquired from the intra-vehicle sensor device 225 installed in the shared vehicle 20. As an example, the intra-vehicle information may be acquired on the basis of visual information such as image information acquired by the intra-vehicle sensor device 225. As another example, the intra-vehicle information may be acquired on the basis of information acquired by the intra-vehicle sensor device 225 such as a LIDAR system. In particular, unlike other object recognition systems, the LIDAR system may acquire shape information, such as the silhouette of an object without identical features (ex. a certain pattern of the object, bland, trademark or individual information may be printed on the object), thus solving the privacy issue with relation to the object.

A shared vehicle service providing process performed by the shared vehicle service providing system according to an emergency call is described in detail below.

Figure 10:
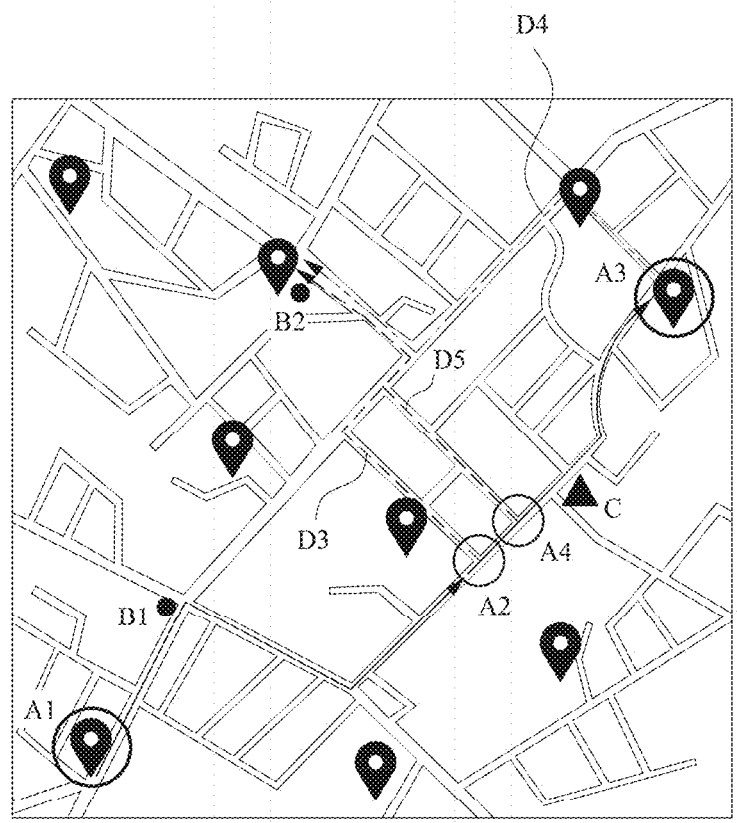
FIG. 10 is a diagram showing a travel path of a vehicle which moves when a problematic situation occurs in the shared vehicle service according to the exemplary embodiment of the present disclosure.

FIG. 10 is a diagram showing a travel path of a vehicle which moves when a problematic situation occurs in the shared vehicle service according to the exemplary embodiment of the present disclosure.

Referring to FIG. 10, A1 denotes a first location of the shared vehicle 20, A2 denotes a second location of the shared vehicle 20 or a drop-off location of a first call message, A3 denotes a third location of the shared vehicle 20 or a drop-off location of a second call message, and A4 denotes a fourth location of the shared vehicle 20 or a certain location in a path for moving to a pickup location of the second call message. B1 denotes a pickup location or a starting point of the first call message of a first user, and B2 denotes an article-reclaiming location of the first user according to an emergency call. C denotes a pickup location or a starting point of the second call message of the second user. Referring to FIG. 10, a path between the second location A2 of the shared vehicle 20 and the article-reclaiming location B2 of the first user according to the emergency call may be referred to as a third path D3, and a path between the third location A3 of the shared vehicle 20 and the article-reclaiming location B2 of the first user may be referred to as a fourth path D4. Referring to FIG. 10, a path between the fourth location A4 of the shared vehicle 20 and the article-reclaiming location B2 of the first user according to the emergency call may be referred to as a fifth path D5.

Figure 11:
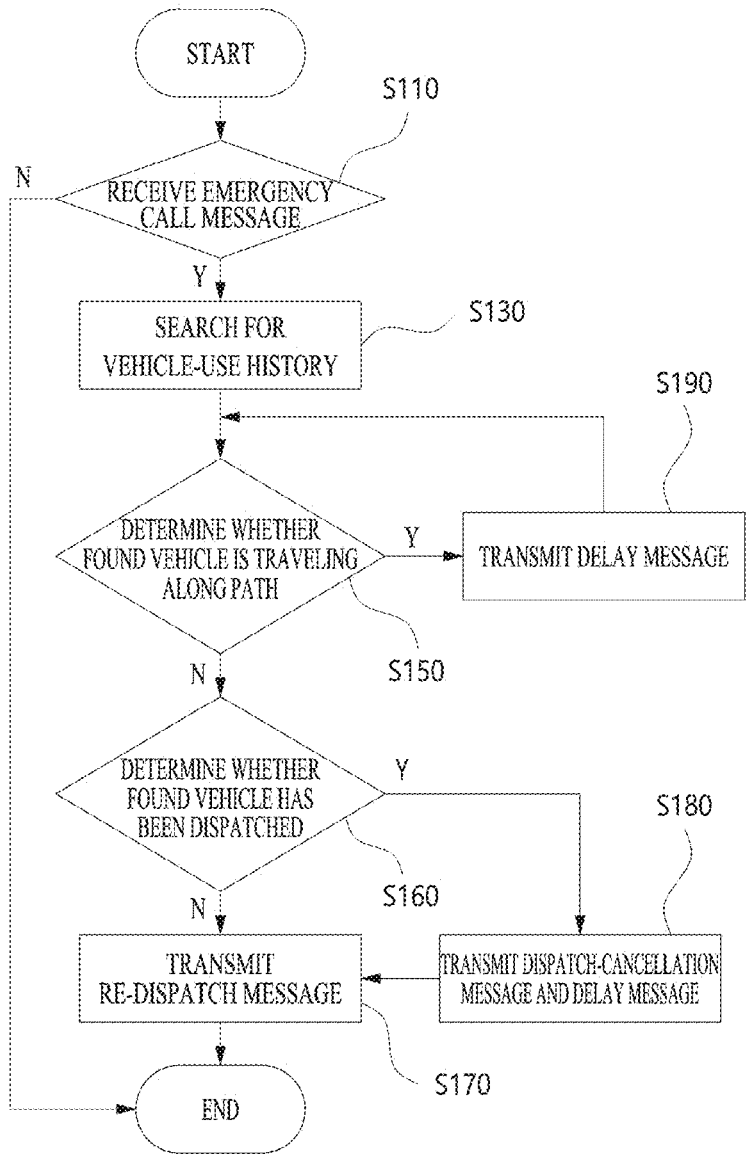
FIG. 11 is a flowchart of the shared vehicle service providing method performed by the shared vehicle management server when a problematic situation occurs in the shared vehicle service according to the exemplary embodiment of the present disclosure.

FIG. 11 is a flowchart of the shared vehicle service providing method performed by the shared vehicle management server when a problematic situation occurs in the shared vehicle service according to the exemplary embodiment of the present disclosure.

Referring to FIG. 11, the shared vehicle service providing method may include at least one of an operation S110 of receiving an emergency call message, an operation S130 of searching for vehicle-use history data, an operation S150 of determining whether a found vehicle is traveling along a path, an operation S160 of determining whether the found vehicle has been dispatched, an operation S170 of transmitting a re-dispatch message, an operation S180 of transmitting a dispatch-cancellation message and a delay message, and an operation S190 of transmitting a delay message. However, the shared vehicle service providing method is not limited to the above operations, and another operation may be further included or an operation thereof may be replaced by another operation as necessary.

FIG. 12 is a table showing service-use history data stored in the shared vehicle management server according to the exemplary embodiment of the present disclosure. FIG. 13 is a table showing vehicle information data stored in the shared vehicle management server according to the exemplary embodiment of the present disclosure.

Referring to FIGS. 1 to 13, according to the shared vehicle service providing method, the shared vehicle service may be provided so that the server 30 receives an emergency call message from the device 10 and/or the shared vehicle 20 (S110). The reception S110 of the emergency call message may be an operation in which the server 30 receives a message reporting that a problematic situation has occurred in the shared vehicle service from the device 10 and/or the shared vehicle 20. As described above, the emergency call message, as related to problematic situations which occur in the shared vehicle service, may include an abnormal vehicle state, surrounding elements, a complaint of a user, loss of a user's article, and the like. In particular, the emergency call message may be a message reporting that a user's article has been lost.

According to the shared vehicle service providing method, the shared vehicle service may be provided so that the server 30 searches for vehicle-use history data corresponding to the emergency call message received in the emergency call receiving operation S110 (S130). The search S130 for vehicle-use history data may be an operation in which a search is performed on the basis of data of the history of using the shared vehicle service. The search S130 for vehicle-use history data may be an operation in which information on a vehicle used by a user of the device 10 is searched for on the basis of data of emergency call message. In particular, when the user of the device 10 has used the shared vehicle service a plurality of times, in the search S130 for vehicle-use history data, a specific use of the shared vehicle service may be searched for according to the content of the emergency call message, and accordingly, a vehicle in which the user's article has been lost may be found.

Referring to FIG. 12, the vehicle-use history data may include passenger information, used vehicle information, starting point and destination information, departure time and arrival time, travel time, cost, and the like. The vehicle-use history data may be classified in order of using the shared vehicle service. The vehicle-use history data may be categorized and arranged on the basis of the passenger information, the used vehicle information, the starting point and destination information, the departure time and arrival time, and the like. In particular, the vehicle-use history data may be searched for on the basis of history data corresponding to passenger information with which the device 10 having transmitted the call message is accessed. The vehicle-use history data may be arranged on the basis of at least one of the passenger information, the used vehicle information, the starting point and destination information, the departure time and arrival time, the travel time, and the cost.

According to the shared vehicle service providing method, the shared vehicle service may be provided so that the server 30 determines whether the found vehicle is traveling along a path in connection with the found vehicle information acquired in the search S130 for vehicle-use history data (S150). The determination S150 of whether the found vehicle is traveling along a path may be an operation of determining whether the found vehicle is currently traveling along a path. The determination S150 of whether the found vehicle is traveling along a path may be an operation of determining whether the found vehicle is traveling along a path at a current time point after the emergency call message is received. The determination S150 of whether the found vehicle is traveling along a path may be an operation of determining whether travel of the found vehicle is completed within a certain time from a time point after the emergency call message is received. The found vehicle traveling along a path may denote that the found vehicle is currently providing the shared vehicle service. The found vehicle traveling along a path may denote that a passenger is currently riding in the found vehicle. The found vehicle traveling along a path may be considered an example of a vehicle-in-use state.

Referring to FIG. 13, the server 30 may determine whether the found vehicle is traveling along a path on the basis of vehicle information data. The vehicle information data may include a vehicle license number, a vehicle type, the number of passengers, a vehicle state, a current location, and the like. As data about a shared vehicle provided in the shared vehicle service, the vehicle information data may be information on the vehicle license number, the vehicle type, the number of passengers, the vehicle state, the current location, etc. which are updated in real time. The vehicle information data may be arranged on the basis of at least one of the vehicle license number, the vehicle type, the number of passengers, the vehicle state, and the current location.

In particular, whether the found vehicle is traveling along a path may be determined on the basis of the vehicle state included in the vehicle information data. The traveling along a path may denote traveling along a path between a starting point and a destination of a call message.

According to the shared vehicle service providing method, the shared vehicle service may be provided so that when it is determined that the found vehicle is traveling or in use in the determination S150 of whether the found vehicle is traveling along a path, the server 30 transmits a delay message to the device 10 from which the emergency call message has been received (S190). The transmission S190 of a delay message may be an operation of transmitting, because the found vehicle corresponding to the emergency call message is currently traveling or in use, a delay message reporting an expected time at which the travel or use will be completed. The delay message may be a message reporting that it will take some time to solve a problematic situation corresponding to the emergency call message. In particular, when the user's article has been lost as a problematic situation corresponding to the emergency call message, the delay message may be a message reporting that a time, at which the found vehicle is re-dispatched to the user so that the user may reclaim the article, is delayed.

According to the shared vehicle service providing method, the shared vehicle service may be provided so that when it is determined that the found vehicle is not traveling in the determination S150 of whether the found vehicle is traveling along a path, the server 30 may determine whether the found vehicle has been dispatched (S160). The determination S160 of whether the found vehicle has been dispatched may be an operation in which a dispatch message has been received by the found vehicle at a current time point after the emergency call message is received. In particular, whether the found vehicle has been dispatched may be determined on the basis of the vehicle state included in the vehicle information data.

The found vehicle which has been dispatched may denote that the shared vehicle service of the found vehicle has been reserved by a call message of another user. The found vehicle which has been dispatched may denote that the found vehicle is moving to a pickup location or a starting point of another user in response to a call message of the other user. The found vehicle which has been dispatched may be considered an example of a reserved vehicle state.

The found vehicle which has not been dispatched may denote that the found vehicle has not yet received a call message of another user. The found vehicle which has not been dispatched may denote that the found vehicle is waiting for a call message of another user. The found vehicle which has not been dispatched may be considered an example of an available vehicle state.

According to the shared vehicle service providing method, the shared vehicle service may be provided so that when it is determined that the found vehicle has not been dispatched in the operation S160 of determining whether the found vehicle has been dispatched, the server 30 may transmit a re-dispatch message to the found vehicle (S170). The transmission S170 of a re-dispatch message may be an operation of transmitting a message reporting that the found vehicle has been re-dispatched to the device 10 of the user who has transmitted the emergency call message. The transmission S170 of a re-dispatch message may be an operation of transmitting a message reporting that the found vehicle will move to allow the user to reclaim the user's lost article to the device 10 of the user who has transmitted the emergency call message. In this case, the transmission S170 of a re-dispatch message may be an operation of transmitting the message including security information of the found vehicle so that the lost article may be reclaimed. This is intended to prevent a third party, who is not the user who has transmitted the emergency call message, from unlocking a door of the found vehicle in which the lost article is loaded or using the vehicle.

According to the shared vehicle service providing method, the shared vehicle service may be provided so that when it is determined that the found vehicle has been dispatched in the operation S160 of determining whether the found vehicle has been dispatched, the server 30 may transmit a dispatch-cancellation message and a delay message regarding the found vehicle (S180). The transmission S180 of a dispatch-cancellation message and a delay message may be an operation of cancelling dispatch of the found vehicle in response to the emergency call message and transmitting a delay message to a user who has transmitted a cancelled call message. In general, the dispatch of the found vehicle is prioritized, but emergency call messages are exceptionally prioritized. Accordingly, the transmission S180 of a dispatch-cancellation message and a delay message may be an operation in which the dispatch may be cancelled. Also, the transmission S180 of a dispatch-cancellation message and a delay message may additionally include an operation of immediately dispatching another shared vehicle 20 for convenience of the user who has transmitted the cancelled call message because the dispatch is cancelled in response to the emergency call message.

Described above is a method of determining whether to immediately reclaim a lost article or prioritize the service for a person who has made a reservation in consideration of an emergency call message according to whether a vehicle state is the available state or the reserved state when a found vehicle has been dispatched. However, in some cases, the subsequent user who transmits the call message and to whom the shared vehicle is dispatched may take priority over the previous user who transmits the emergency call message.

According to the shared vehicle service providing method according to the exemplary embodiment of the present disclosure, when an emergency call message of a second user is received after a shared vehicle is dispatched to a first user by a call message of the first user being received, the shared vehicle may be moved on the basis of location information of the first user.

Specifically, after the server 30 dispatches a shared vehicle to the first user in response to a call message received from the first user, the server 30 may receive an emergency call message about a lost article from the second user. In this case, the server 30 may complete dispatch and travel of the shared vehicle for the first user and then re-dispatch the shared vehicle to the second user regardless of whether the dispatch has been completed (e.g., the vehicle is in the in-use state) or in progress (e.g., the vehicle is in the reserved state).

The server 30 may determine the order of priority of the emergency call message and the shared vehicle dispatch on the basis of a time point at which the emergency call message of the second user is received and a state of the shared vehicle (e.g., the available state, the reserved state, or the in-use or driving state). Here, the server 30 may transmit a delay message to the second user on the basis of dispatch or travel information of the shared vehicle.

According to the shared vehicle service providing method according to another exemplary embodiment of the present disclosure, when an emergency call message of a second user is received after a shared vehicle is dispatched to a first user by a call message of the first user being received, the first user may be requested to select the order of priority. For example, in the above-described situation, the server 30 may request the first user to make a selection for re-dispatch.

Specifically, the server 30 may transmit re-dispatch request information to the first user together with information indicating that the shared vehicle has a lost article and receive a selection of the first user. To the first user, the server 30 may also provide information indicating that a certain reward may be provided when the first user selects re-dispatch. The certain reward may be used at least for the shared vehicle service.

The server 30 may receive re-dispatch approval from the first user. When the server 30 receives the re-dispatch approval, the server 30 may dispatch the shared vehicle to the second user and dispatch another shared vehicle to the first user. In this case, the server 30 may charge the second user for the dispatch of the shared vehicle on the basis of location information of the second user and may provide a reward to the second user for the approval for re-dispatch on the basis of the amount charged to the second user.

On the other hand, the server 30 may receive re-dispatch disapproval from the first user. When the server 30 receives the re-dispatch disapproval, the server 30 may move the shared vehicle to the first user to complete the ride and travel of the first user. After that, the server 30 may dispatch the shared vehicle to the second user and charge the second user for the related cost.

Meanwhile, the server 30 may receive the emergency call message when the shared vehicle is in the available state. In this case, the server 30 may dispatch the shared vehicle to the second user who has transmitted the emergency call message and charge the second user for the related cost.

Figure 14:
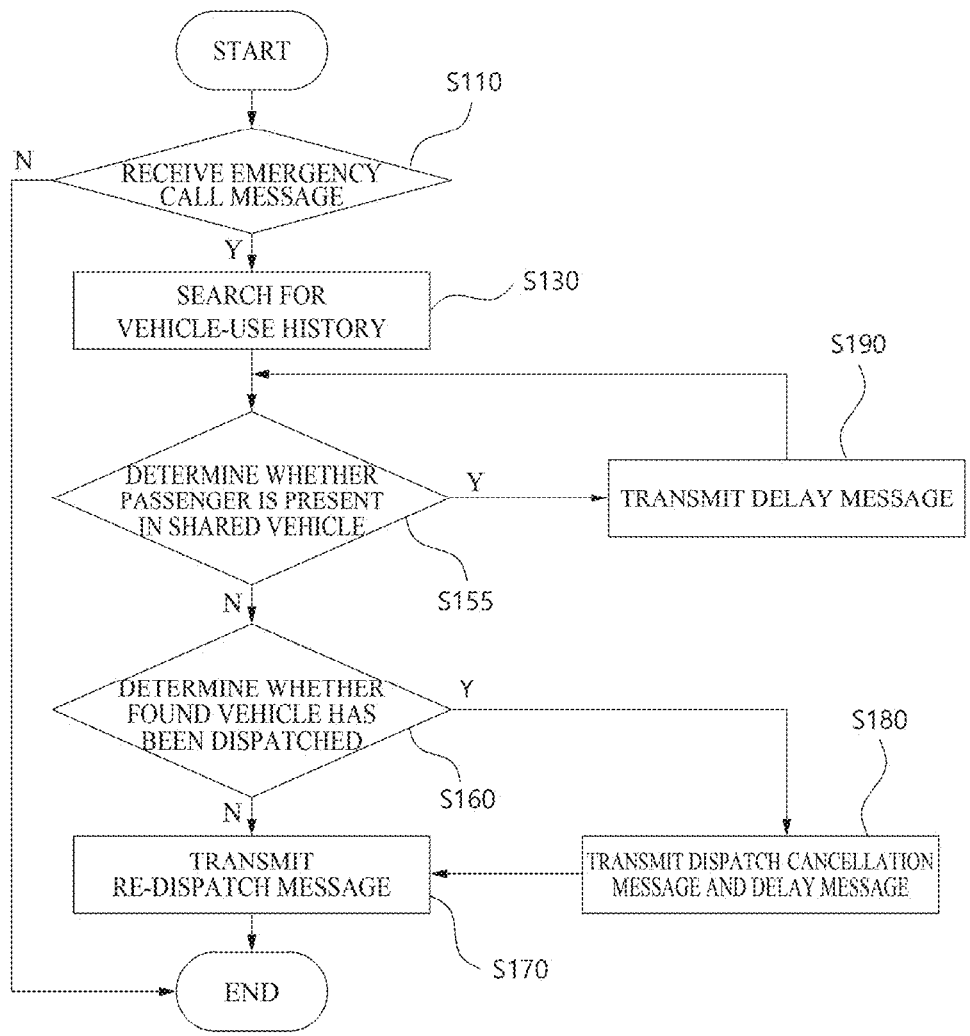
FIG. 14 is a flowchart of the shared vehicle service providing method performed by the shared vehicle management server when a problematic situation occurs in the shared vehicle service according to the exemplary embodiment of the present disclosure.

FIG. 14 is a flowchart of the shared vehicle service providing method performed by the shared vehicle management server when a problematic situation occurs in the shared vehicle service according to the exemplary embodiment of the present disclosure.

Referring to FIG. 14, the shared vehicle service providing method may include at least one of an operation S110 of receiving an emergency call message, an operation S130 of searching for vehicle-use history data, an operation S155 of determining whether a passenger is in a found vehicle, an operation S160 of determining whether the found vehicle has been dispatched, an operation S170 of transmitting a re-dispatch message, an operation S180 of transmitting a dispatch-cancellation message and a delay message, and an operation S190 of transmitting a delay message. However, the shared vehicle service providing method is not limited to the above operations, and another operation may be further included or an operation thereof may be replaced by another operation as necessary.

The determination S155 of whether a passenger is in a found vehicle may be made on the basis of whether a passenger is in the shared vehicle rather than a state of vehicle use. When it is determined that no passenger is in the shared vehicle 20 corresponding to the emergency call message in the determination S155 of whether a passenger is in a found vehicle, the shared vehicle 20 may immediately respond to the emergency call message. Also, when it is determined that a passenger is in the shared vehicle 20 corresponding to the emergency call message in the determination S155 of determining whether a passenger is in a found vehicle, the shared vehicle 20 may respond to the emergency call message after the shared vehicle service is completed.

Therefore, the shared vehicle service providing method according to the exemplary embodiment of the present disclosure allows a problematic situation, which occurs in a user's process of using the shared vehicle service, to be smoothly solved through dispatch management in which the problematic situation is taken into consideration. Also, the shared vehicle service allows a problematic situation to be smoothly solved through dispatch management in which article handling is taken into consideration. In particular, the present disclosure relates to a device, vehicle, system, and method for handling a lost article arising from a user's process of using the shared vehicle service of an autonomous vehicle, and when a user loses his or her article, the shared vehicle service allows the lost article to be safely reclaimed by a passenger or a vehicle. Also, the present disclosure relates to a device, vehicle, system and method for handling a lost article arising from a user's process of using the shared vehicle service of an autonomous vehicle, and in the shared vehicle service, vehicle dispatch can be systematically managed in consideration of an emergency situation such as a user who has lost an article.

A billing process of a shared vehicle service for an emergency call is described in detail below.

Figure 15:
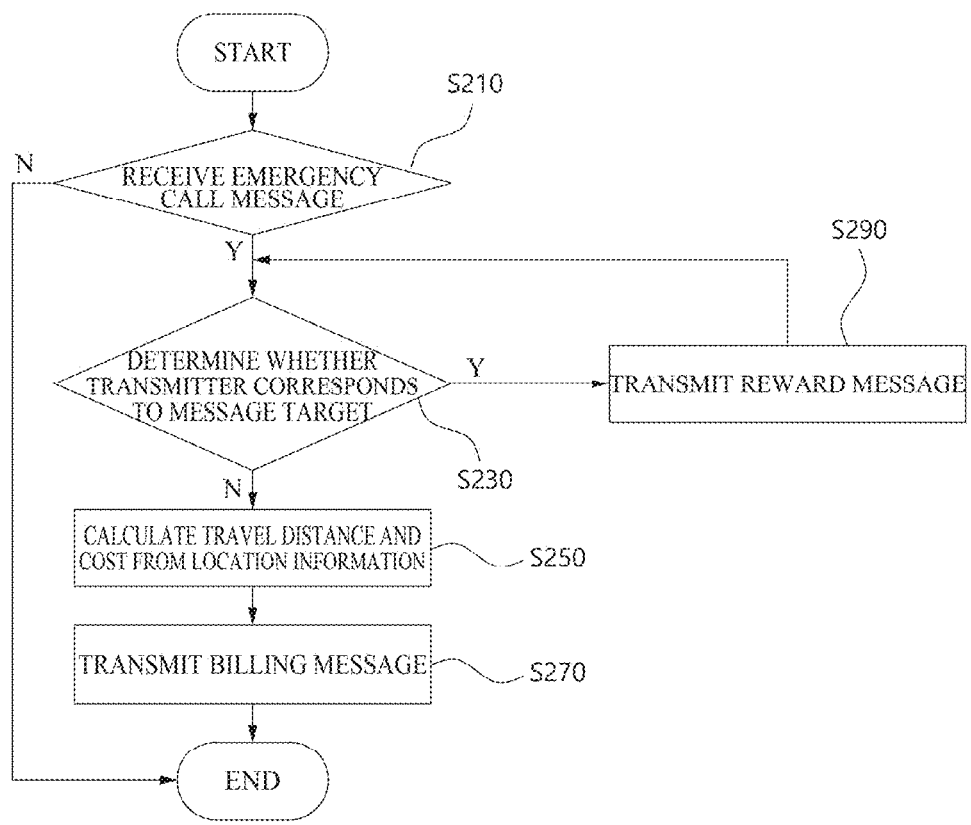
FIG. 15 is a flowchart of a billing process performed by the shared vehicle management server when a problematic situation occurs in the shared vehicle service according to the exemplary embodiment of the present disclosure.

FIG. 15 is a flowchart of a billing process performed by the shared vehicle management server when a problematic situation occurs in the shared vehicle service according to the exemplary embodiment of the present disclosure. Referring to FIG. 15, the billing process may include at least one of an operation S210 of receiving an emergency call message, an operation S230 of determining whether a transmitter corresponds to a message target, an operation S250 of calculating a travel distance and cost from location information, an operation S270 of transmitting a billing message, and an operation S290 of transmitting a reward message. However, the billing process for an emergency call is not limited to the above operations, and another operation may be further included or an operation thereof may be replaced by another operation as necessary.

The receiving S210 of an emergency call message may be an operation in which the shared vehicle management server 30 receives an emergency call transmitted from the user device 10 and/or the shared vehicle 20. Also, the receiving S210 of an emergency call message may additionally include an operation in which the shared vehicle management server 30 transmits a message for checking content of the emergency call to the user device 10 and/or the shared vehicle 20 on the basis of the emergency call received by the shared vehicle management server 30.

The determination S230 of whether a transmitter corresponds to a message target may be an operation of determining whether a transmitter of the emergency call message received in the emergency call message receiving operation S210 corresponds to a target or a user corresponding to the emergency call message. For example, in the emergency call, a user who first uses the shared vehicle 20 may be assumed to be a first user, and a user who uses the shared vehicle 20 subsequent to the first user may be assumed to be a second user. After the first user finishes using the shared vehicle service of the shared vehicle 20, the first user may transmit the emergency call message to the shared vehicle management server 30 regardless of whether the second user uses the shared vehicle service. In this case, in the determination S230 of whether a transmitter corresponds to a message target, the transmitter may be determined to correspond to the message target. On the other hand, after the first user finishes using the shared vehicle service of the shared vehicle 20, the second user who is using the shared vehicle service may transmit the emergency call message about an article in the shared vehicle 20 to the shared vehicle management server 30. In this case, in the determination S230 of whether a transmitter corresponds to a message target, the transmitter may be determined not to correspond to the message target. However, the determination S230 of whether a transmitter corresponds to a message target may be omitted when the emergency call message is transmitted from the shared vehicle 20.

In the calculation S250 of a travel distance and cost from location information, the shared vehicle 20 receives the emergency call message from the shared vehicle management server 30, and then a travel distance and a travel cost may be calculated on the basis of location information of the shared vehicle 20 and location information of the user corresponding to the emergency call message. The location information of the shared vehicle 20 may be current location information, and when the shared vehicle 20 is in use, the location information of the shared vehicle 20 may be information on a location at which the shared vehicle service is completed. The location information of the user may be information on a location at which the user wants to reclaim the article included in the emergency call message or current location information of the user. Also, in the calculation S250 of a travel distance and cost from location information, the travel cost for the travel distance may be calculated according to a certain criterion so that a cost may be determined in the billing process. The cost resulting from the emergency call message may be discounted according to the history of using the shared vehicle service.

The transmission S270 of a billing message may be an operation of transmitting a message which charges the user corresponding to the emergency call message the cost resulting from reclaiming of the article corresponding to the emergency call message. The transmission S270 of a billing message may be an operation of transmitting a billing message, which includes the cost calculated in the calculation S250 of a travel distance and cost from location information, to the user device 10.

The transmission S290 of a reward message may be an operation of transmitting a reward message for the transmission of the emergency call message to the second user when the transmitter does not correspond to the target of the emergency call message as described above in the determination S230 of whether a transmitter corresponds to a message target. The reward message may be a message for providing a reward to a user who transmits an emergency call message for another user's article when using the shared vehicle management service. The reward message may include reward information such as a coupon, discount information, and points which may be used in the shared vehicle service.

In the shared vehicle service according to the exemplary embodiment of the present disclosure, the shared vehicle 20 may be re-dispatched to the user according to an emergency call, and a user is charged and/or rewarded accordingly. Since it is possible to immediately deal with a user who has lost his or her article and also induce voluntary action of another user, the user's convenience can be improved.

A shared vehicle management process related to storing a user's article is described in detail below.

Figure 16:
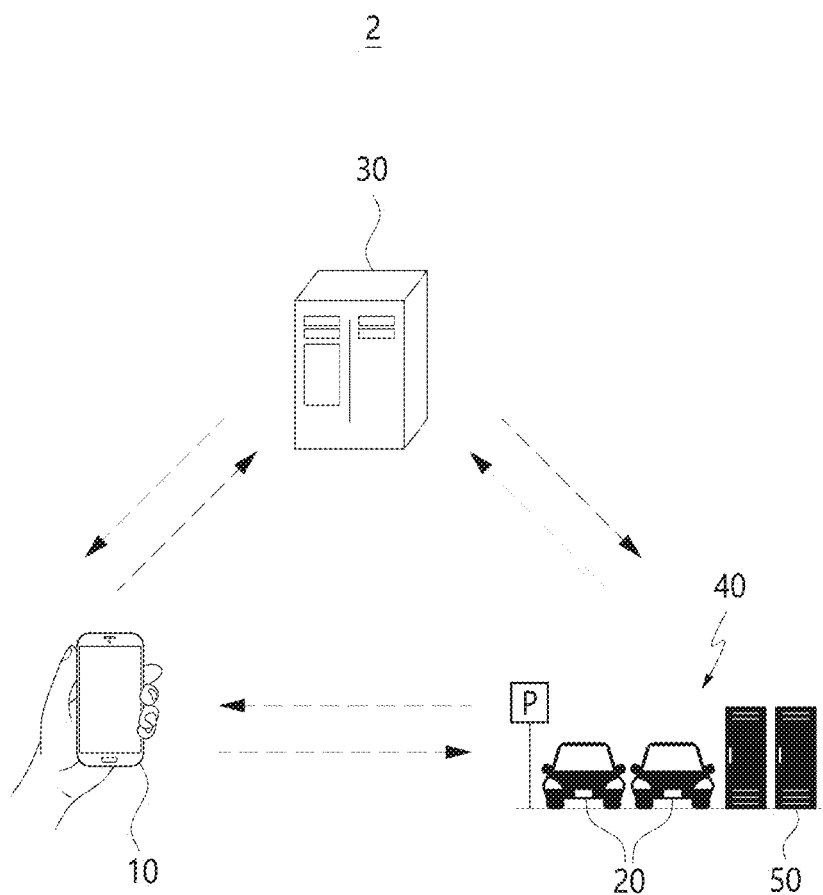
FIG. 16 is a diagram illustrating a shared vehicle service providing system in relation to article storing according to the exemplary embodiment of the present disclosure.

FIG. 16 is a diagram illustrating a shared vehicle service providing system in relation to article storing according to an exemplary embodiment of the present disclosure. Referring to FIG. 16, a shared vehicle service providing system 2 may include at least one of a smart device 10, a shared vehicle 20, a shared vehicle management server 30, and a shared vehicle storage 40. Referring to FIGS. 1 and 9, the smart device 10, the shared vehicle 20, and the shared vehicle management server 30 are similar or identical to those described above, and thus the shared vehicle storage 40 is described in detail.

The shared vehicle storage 40 may be a place in which the shared vehicle is parked. The shared vehicle storage 40 may be at least one of storages associated with the shared vehicle management service among a plurality of storages included in map data stored in the shared vehicle management server 30. The shared vehicle storage 40 may be a waiting place for a call message of a user related to the shared vehicle management service. Location data of the shared vehicle storage 40 may be stored in the shared vehicle management server 30. The location data of the shared vehicle storage 40 may be shared with the smart device 10 and the shared vehicle 20 by the shared vehicle management server 30.

In addition, the shared vehicle storage 40 may be a place in which the shared vehicle 20 is parked and may include a storage 50 in which an article requested to be stored by a passenger of the shared vehicle service may be stored.

Among the elements of the shared vehicle service providing system 2, the shared vehicle storage 40 is described in further detail below.

A passenger who uses the shared vehicle service may need a place for storing an article when residing in a place for a short time period without any type of residence such as a hotel or a house. Also, a passenger who uses the shared vehicle service may need a place for storing an article when he or she does not have a destination. For such a case, the shared vehicle storage 40 may include the storage 50 in which an article of a passenger who uses the shared vehicle service may be stored.

Accordingly, a passenger who uses the shared vehicle service may temporarily store an article in the storage 50 and thus can smoothly do activities without the article. Also, a passenger who uses the shared vehicle service may temporarily store an article in the storage 50 and reclaim the article at a desired time point and a desired location.

The storage 50 may have an arbitrary form including a certain storage space. For example, the storage 50 may be a storage space, such as a box, a storehouse, a shelf, a cabinet, or a container, having partitioned spaces. The storage 50 may have an arbitrary form including a certain storage space and include a plurality of spaces separated and spaced apart from each other. In the plurality of spaces of the storage 50, articles of a plurality of passengers may be separately stored. Also, since the storage 50 may include a plurality of spaces having various sizes, articles of a plurality of passengers may be separately stored in consideration of sizes thereof.

The storage 50 may have a certain personal authentication means for security of articles stored therein. The personal authentication means may use means such as barcodes, quick response (QR) codes, radio frequency identification (RFID), passwords, patterns, and biometric recognition. An article stored in the storage 50 may be reclaimed on the basis of at least one of the personal authentication means. An article stored in the storage 50 may be reclaimed in person by a passenger who is the owner of the article on the basis of the personal authentication means. An article stored in the storage 50 may be indirectly reclaimed by a passenger who is the owner of the article through the shared vehicle 20 parked in the shared vehicle storage 40 in which the storage 50 is present, and the shared vehicle 20 may provide the personal authentication means of the passenger on behalf of the passenger. Also, an article stored in the storage 50 may be indirectly reclaimed by a passenger who is the owner of the article through the shared vehicle 20 parked in the shared vehicle storage 40 in which the storage 50 is present, and an arbitrary manager of the shared vehicle storage 40 may use the personal authentication means of the passenger on behalf of the passenger or by being delegated right of the passenger and load the shared vehicle 20.

The storage 50 may have a certain storage space in which articles may be stored, and the articles may be contained in certain storage containers (or storage cabinets) which may be stored in the storage 50. In other words, the storage 50 may have an arbitrary form including a certain storage space in which the storage containers containing articles may be stored. For example, a storage container may have a certain personal authentication means. The certain personal authentication means is the same as described above. In this case, an article may be contained in the storage container, and a personal authentication means may be set in the storage container. When the storage container is retrieved, the article may be reclaimed with the personal authentication means. The storage containers may be stored in the storage 50, and a personal authentication means set in the storage containers may be identical to or different from the personal authentication means set in the storage 50.

An article contained in the storage container may be reclaimed in person by a passenger who is the owner of the article with the personal authentication means. Also, the article contained in the storage container may be indirectly reclaimed by the passenger who is the owner of the article through the shared vehicle 20 parked in the shared vehicle storage 40 in which the storage 50 is present, and the shared vehicle 20 may provide the personal authentication means of the passenger on behalf of the passenger. Further, the article contained in the storage container may be indirectly reclaimed by the passenger who is the owner of the article through the shared vehicle 20 parked in the shared vehicle storage 40 in which the storage 50 is present, and an arbitrary manager of the shared vehicle storage 40 may use the personal authentication means of the passenger on behalf of the passenger or by being delegated right of the passenger and load the shared vehicle 20. In this case, the storage container or only the article contained in the storage container may be loaded in the shared vehicle 20.

The shared vehicle management process related to storing a user's article is described in further detail below according to the exemplary embodiment of the present disclosure.

Figure 17:
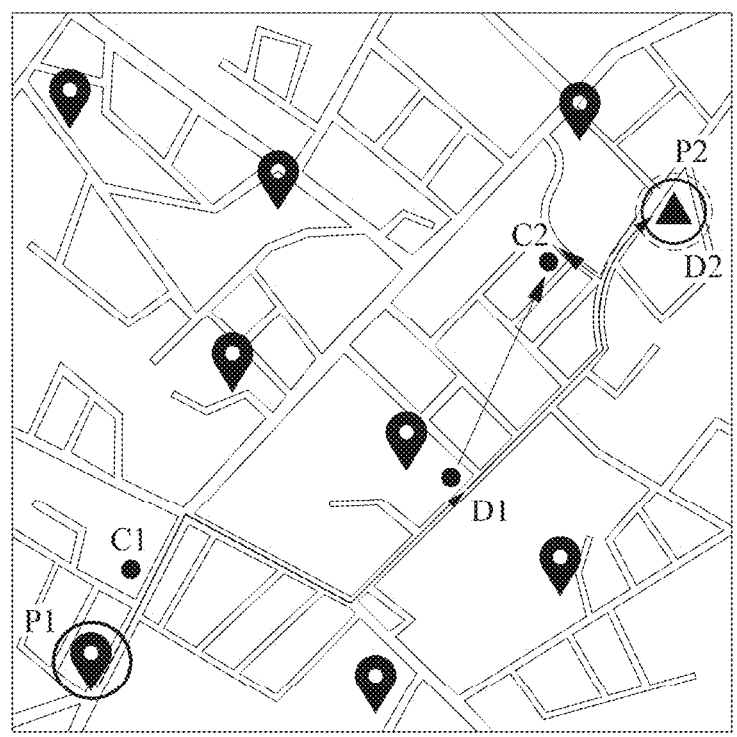
FIGS. 17 to 20 illustrate a shared vehicle management process related to article storing according to the exemplary embodiment of the present disclosure.
Figure 18:
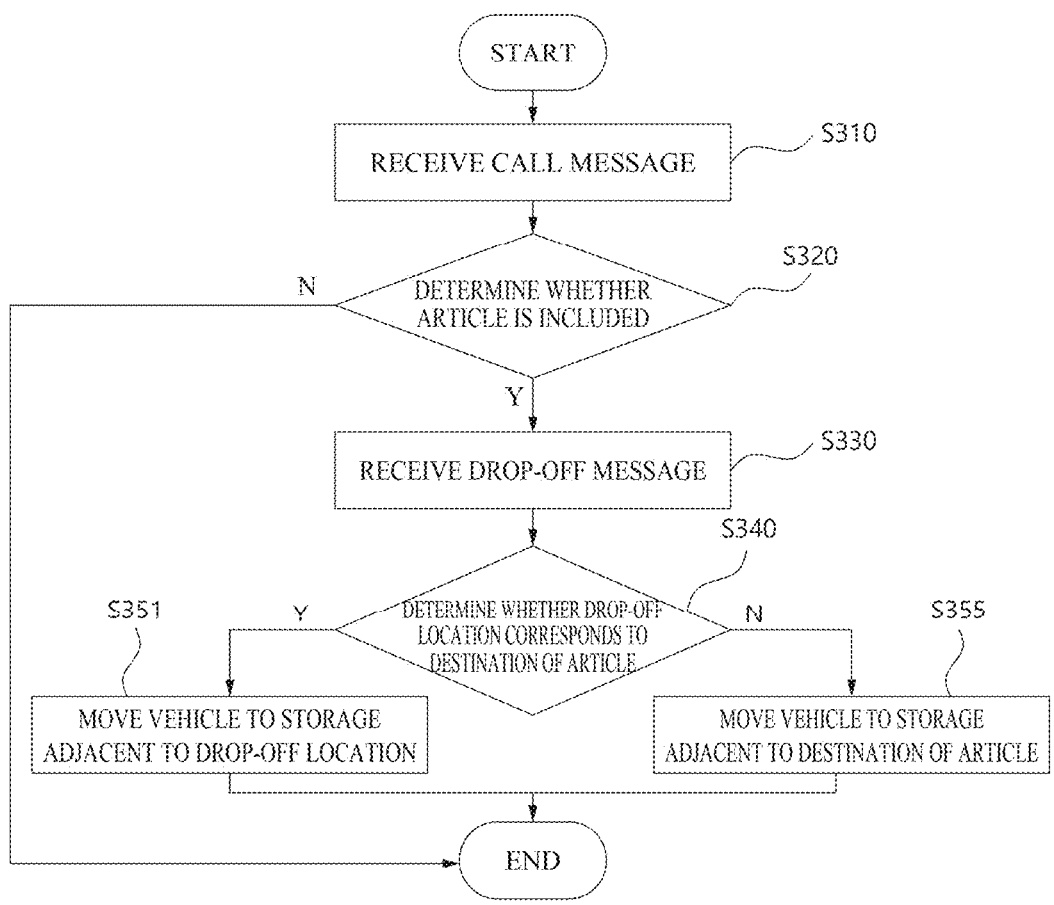

FIGS. 17 to 20 illustrate a shared vehicle management process related to article storing according to the exemplary embodiment of the present disclosure. FIG. 17 is a diagram showing a travel path of a shared vehicle related to article storing according to a call message of a passenger. FIG. 18 is a flowchart illustrating a shared vehicle management process according to whether a drop-off location and a destination of an article correspond to each other in a call message of a passenger.

Referring to FIGS. 1 to 18, the shared vehicle service may provide a first storage P1 and a second storage P2 as the shared vehicle storage 40. According to the shared vehicle service, the shared vehicle 20, which is parked in the first storage P1 adjacent to a pickup location included in a first call message C1 of a passenger, may be dispatched. According to the shared vehicle service, a destination included in the first call message C1 of the passenger may include a first destination D1 and a second destination D2. The first destination D1 may be a drop-off location of the passenger, and the second destination D2 may be a location for storing an article of the passenger. In the shared vehicle service, the article may be reclaimed by the shared vehicle 20 parked in the article storing location D2 according to an article-reclaiming request included in a second call message C2 of the passenger.

Referring to FIGS. 1 to 18, the shared vehicle management process may include at least one of an operation S310 of receiving a call message, an operation S320 of determining whether an article is included, an operation S330 of receiving a drop-off message, an operation S340 of determining whether a drop-off location corresponds to the destination of an article, an operation S351 of storing the article in a storage adjacent to the drop-off location, and an operation S355 of storing the article in a storage adjacent to the destination of the article. However, the shared vehicle management process is not limited to the above operations, and another operation may be further included or an operation thereof may be replaced by another operation as necessary.

The reception S310 of a call message may be an operation of receiving a call message from a passenger of the shared vehicle service. In the reception S310 of a call message, a call message may be received from a passenger of the shared vehicle service, and a first shared vehicle may be dispatched among a plurality of shared vehicles 20 parked in the first storage P1 adjacent to a pickup location of the passenger included in the call message. Other details of the reception S310 of a call message may be the same as described above.

The determination S320 of whether an article is included may be an operation of determining whether article information is included in user information which is included in the call message received in the reception S310 of a call message. The determination S320 of whether an article is included may be an operation of determining whether a request to store the article of the user is included in the user information which is included in the call message. In particular, the determination S320 of whether an article is included may be an operation of determining whether there is a request to store any one of the user's articles when the user uses the shared vehicle service. The determination S320 of whether an article is included may be made on the basis of whether a request to store an article is included in the call message or whether an article is stored in a certain location in the shared vehicle related to a request for storing. The certain location may be the trunk or a separately partitioned storage space in the shared vehicle. Also, the certain location may be an area secured by a personal authentication means.

The reception S330 of a drop-off message may be an operation of receiving a drop-off message of the user of the shared vehicle service. The drop-off message may indicate that the former of the first destination D1 and the second destination D2 included in the call message of the user of the shared vehicle service is the drop-off location. In the reception S330 of a drop-off message, the drop-off message may be received by the shared vehicle management server 30 from at least one of the smart device 10 and the shared vehicle 20. In the reception S330 of a drop-off message, although details of the user's drop off are received by the shared vehicle management server 30, the drop-off message may include that the article has been loaded in the shared vehicle 20 by at least one of the smart device 10 and the shared vehicle 20.

In the determination S340 of whether a drop-off location corresponds to the destination of an article, whether the drop-off location of the passenger corresponds to the destination of the article may be determined from the user information received in at least one of the call message receiving operation S310 and the drop-off message receiving operation S330. In the determination S340 of whether a drop-off location corresponds to the destination of an article, it may be determined whether the first destination D1 and the second destination D2 included in the call message of the user of the shared vehicle service correspond to each other. Even when the first destination D1 and the second destination D2 are within a close range based on a certain criterion, the first destination D1 and the second destination D2 may be determined to correspond to each other. In the determination S340 of whether a drop-off location corresponds to the destination of an article, whether to store the article in a storage adjacent to the first destination D1 or a storage adjacent to the second destination D2 may be determined according to whether the first destination D1 and the second destination D2 correspond to each other.

The storing S351 of the article in a storage adjacent to the drop-off location or the storing S355 of the article in a storage adjacent to the destination of the article may be performed according to a result of the determination S340 of whether a drop-off location corresponds to the destination of an article. The storing S351 of the article in a storage adjacent to the drop-off location may be an operation in which the article is stored in a storage adjacent to the drop-off location when the drop-off location and the destination of the article are determined to correspond to each other on the basis of the user information of the passenger who uses the shared vehicle service. Also, the storing S355 of the article in a storage adjacent to the destination of the article may be an operation in which the article is stored in a storage adjacent to the destination of the article when the drop-off location and the destination of the article are determined to differ from each other on the basis of the user information of the passenger who uses the shared vehicle service. As described above, the article may be stored in the storage 50 included in the first storage P1 or the second storage P2 which is the shared vehicle storage.

A billing process is described in detail below in relation to the shared vehicle service related to article storing according to the exemplary embodiment of the present disclosure.

Figure 19:
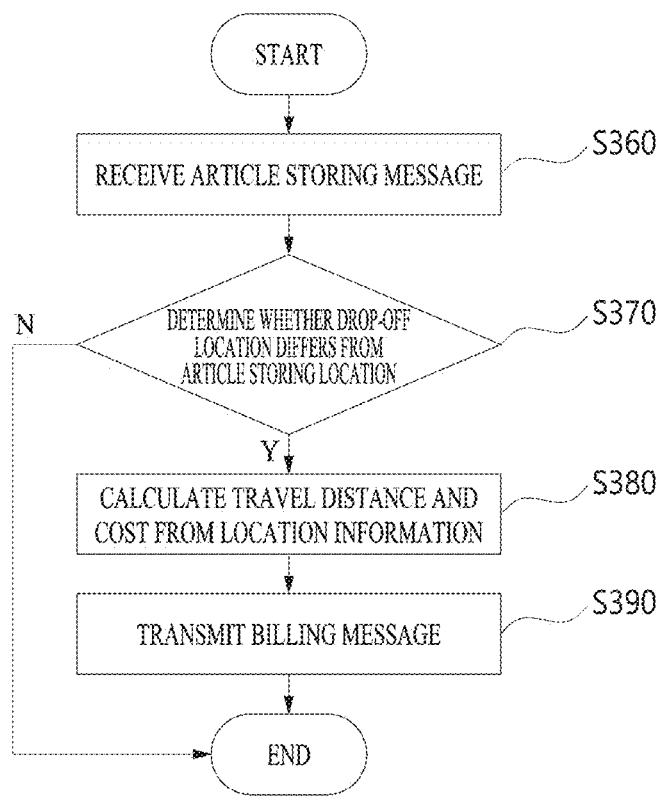
Figure 20:
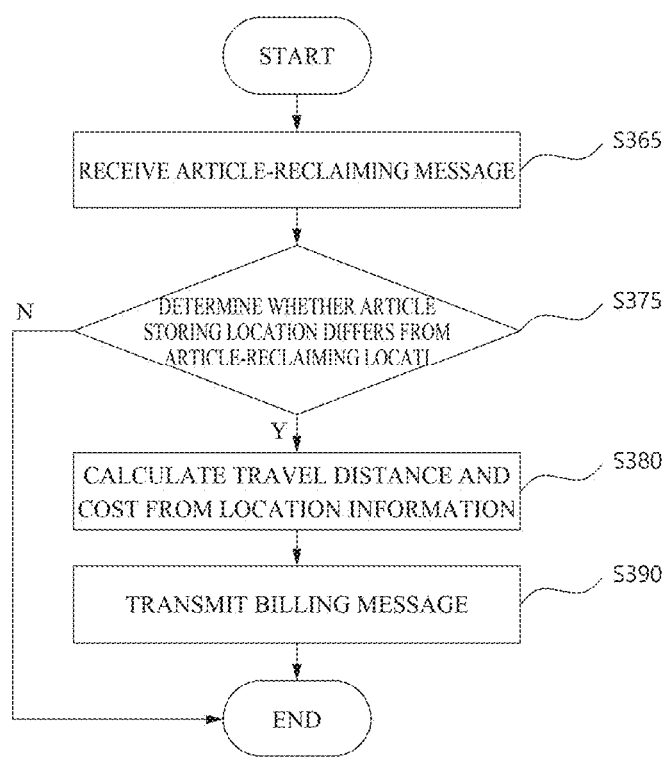

FIGS. 19 and 20 are flowcharts illustrating a billing process upon storing a passenger's article.

Referring to FIG. 19, the billing process upon storing an article of a passenger may include at least one of an operation S360 of receiving an article storing message, an operation S370 of determining whether a drop-off location and an article storing location differ from each other, an operation S380 of calculating a travel distance and cost from location information, and an operation S390 of transmitting a billing message. However, the billing process upon storing a passenger's article is not limited to the above operations, and another operation may be further included or an operation thereof may be replaced by another operation as necessary.

In the reception S360 of an article storing message, the article storing message may be received by the smart device 10 from at least one of the shared vehicle 20 and the shared vehicle management server 30. In the reception S360 of an article storing message, a message including information that the article has been stored may be received by the smart device 10 from at least one of the shared vehicle 20 and the shared vehicle management server 30. The storage 50 may be connected to the shared vehicle management server 30 by a separate communication device. In the reception S360 of an article storing message, the information that the article has been stored may be provided by the storage 50 to the shared vehicle management server 30, and the smart device 10 may receive the information that the article has been stored in the storage 50 from the shared vehicle management server 30.

In particular, the article storing message may include information that the article of the user or passenger who uses the shared vehicle management service is stored in at least a partial area of the storage 50 of the shared vehicle storage 40. Also, the article storing message may also include information that the article of the user or passenger who uses the shared vehicle management service has passed through a security process with a separate authentication means and is stored in at least a partial area of the storage 50 of the shared vehicle storage 40. Consequently, the article storing message may include information on a location, date, time, place, authentication means, etc. at or by which the article of the user or passenger who uses the shared vehicle management service has been stored.

The determination S370 of whether a drop-off location and an article storing location differ from each other may be an operation of determining whether the drop-off location of the user or passenger who uses the shared vehicle management service differs from the storage location of the article of the user or passenger. As an example, the user or passenger may use the shared vehicle management service and disembark at the shared vehicle storage 40 corresponding to the storage location of the article. In this case, the drop-off location corresponds to the storage location of the article, and the user or passenger may be charged only for the shared vehicle service on the basis of a distance that the user or passenger has moved to the drop-off location and may not be additionally charged for the transportation cost of the article. As another example, the user or passenger may use the shared vehicle management service and the drop-off location and the storage location of the article may differ from each other. In this case, the user or passenger may be additionally charged for the transportation cost of the article on the basis of a distance that the shared vehicle 20 has moved from the drop-off location to the storage location of the article. Accordingly, the determination S370 of whether a drop-off location and an article storing location differ from each other may be an operation of determining whether the drop-off location and the storage location of the article differ from each other in order to charge the user or passenger for the transportation cost of the article on the basis of the determination.

After the shared vehicle 20 receives the article storing message from the shared vehicle management server 30, in the calculation S380 of a travel distance and cost from location information, a travel distance and a travel cost may be calculated on the basis of the drop-off location information of the user and location information of the shared vehicle storage 40 corresponding to the storage location of the article. The drop-off location information of the user may be current location information of the smart device 10 or the shared vehicle 20, that is, location information of the smart device 10 or the shared vehicle 20 of which the shared vehicle service has been completed. In the calculation S380 of a travel distance and cost from location information, a travel distance and a travel cost may be calculated according to a certain criterion so that a cost may be determined in the billing process. Also, the cost resulting from the article storing message may be discounted according to the history of using the shared vehicle service.

The transmission S390 of a billing message may be an operation of transmitting a message charging the user corresponding to the article storing message for the cost of storing the article corresponding to the article storing message. The transmission S390 of a billing message may be an operation of transmitting a message including the cost calculated in the calculation S380 of a travel distance and cost from location information to the smart device 10.

Referring to FIG. 20, the billing process upon reclaiming of an article of a passenger may include at least one of an operation S365 of receiving an article-reclaiming message, an operation S375 of determining whether an article storing location and an article-reclaiming location differ from each other, an operation S380 of calculating a travel distance and cost from location information, and an operation S390 of transmitting a billing message. However, the billing process upon reclaiming a passenger's article is not limited to the above operations, and another operation may be further included or an operation thereof may be replaced by another operation as necessary.

In the reception S365 of an article-reclaiming message, the article-reclaiming message may be received by at least one of the shared vehicle 20 and the shared vehicle management server 30 from the smart device 10. In the reception S360 of an article-reclaiming message, at least one of the shared vehicle 20 and the shared vehicle management server 30 may receive a message including information that the smart device 10 requests at least one of the shared vehicle 20 and the shared vehicle management server 30 to reclaim the article. The storage 50 may be connected to the shared vehicle management server 30 by a separate communication device. In the reception S365 of an article-reclaiming message, the information that the smart device 10 requests reclaiming of the article may be provided to the shared vehicle management server 30, and the storage 50 may receive the information that reclaiming of the article is requested by the smart device 10 from the shared vehicle management server 30.

In particular, the article-reclaiming message may include information that the user or passenger who uses the shared vehicle management service requests reclaiming of the article stored in at least a partial area of the storage 50 of the shared vehicle storage 40. Also, the article-reclaiming message may also include information requesting reclaiming of the article of the user or passenger who uses the shared vehicle management service through a security process for at least a partial area of the storage 50 of the shared vehicle storage 40 based on a separate authentication means. Consequently, the article-reclaiming message may include information requesting reclaiming of the article corresponding to the location, date, time, place, authentication means, etc. at or by which the article of the user or passenger who uses the shared vehicle management service has been stored.

The determination S375 of whether an article storing location and an article-reclaiming location differ from each other may be an operation of determining whether the article storing location and article-reclaiming location of the user or passenger who uses the shared vehicle management service differ from each other. As an example, the user or passenger may use the shared vehicle management service and request article reclaiming at the shared vehicle storage 40 corresponding to the storage location of the article. In this case, the reclaiming location corresponds to the storage location of the article, and the user or passenger may not be additionally charged for the reclaiming cost of the article. As another example, the user or passenger may use the shared vehicle management service and the article storing location and the article-reclaiming location may differ from each other. In this case, the user or passenger may be additionally charged for the reclaiming cost of the article on the basis of a distance that the shared vehicle 20 has moved from the article storing location to the article-reclaiming location. Accordingly, the determination S375 of whether an article storing location and an article-reclaiming location differ from each other may be an operation of determining whether a travel path is generated because the article storing location and the article-reclaiming location differ from each other in order to charge the user or passenger for the reclaiming cost of the article on the basis of the determination.

After the shared vehicle 20 receives the article-reclaiming message from the shared vehicle management server 30, in the calculation S380 of a travel distance and cost from location information, a travel distance and a travel cost may be calculated on the basis of the article-reclaiming location information of the user and location information of the shared vehicle storage 40 corresponding to the article storing location. The article-reclaiming location information of the user may be current location information of the smart device 10, that is, location information of the smart device 10 for which the shared vehicle service has been completed. In the calculation S380 of a travel distance and cost from location information, a travel distance and a travel cost may be calculated according to a certain criterion so that a cost may be determined in the billing process. Also, the cost resulting from the article-reclaiming message may be discounted according to the history of using the shared vehicle service.

The transmission S390 of a billing message may be an operation of transmitting a message charging the user corresponding to the article-reclaiming message for the cost of reclaiming the article corresponding to the article-reclaiming message. The transmission S390 of a billing message may be an operation of transmitting a message including the cost calculated in the calculation S380 of a travel distance and cost from location information to the smart device 10.

The shared vehicle management process for a plurality of users related to article storing is described in further detail below according to the exemplary embodiment of the present disclosure.

Figure 21:
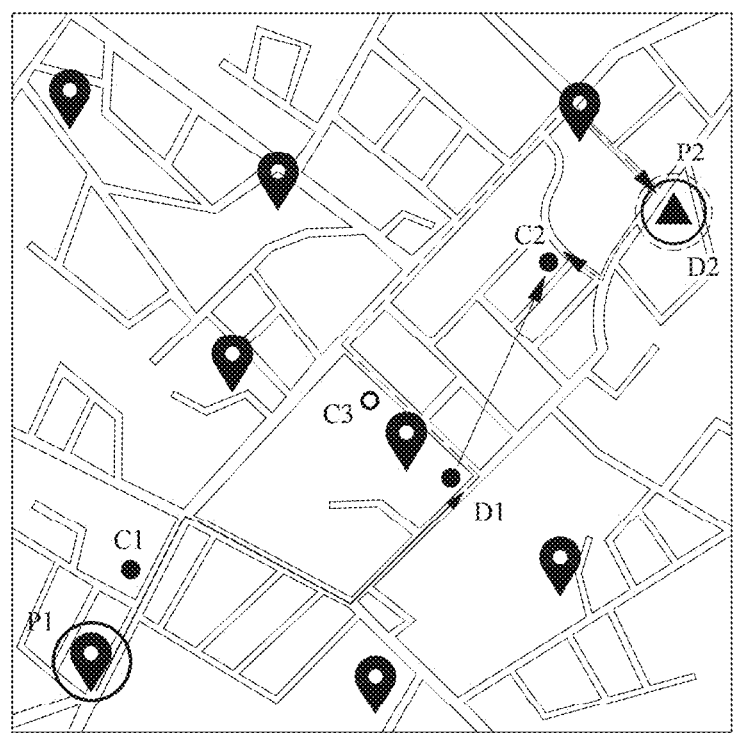

FIGS. 21 to 23 illustrate a shared vehicle management process for a plurality of users related to article storing according to the exemplary embodiment of the present disclosure. FIG. 21 is a diagram showing a travel path of a shared vehicle related to article storing according to call messages of a plurality of passengers. FIGS. 22 and 23 are flowcharts illustrating shared vehicle management processes according to a plurality of passengers' call messages for the same vehicle.

Referring to FIG. 21, like FIG. 17, the shared vehicle service may provide the first storage P1 and the second storage P2 as the shared vehicle storage 40 of the shared vehicle 20. According to the shared vehicle service, the shared vehicle 20, which is parked in the first storage P1 adjacent to a pickup location included in the first call message C1 of a passenger, may be dispatched. According to the shared vehicle service, a destination included in the first call message C1 of the passenger may include the first destination D1 and the second destination D2. The first destination D1 may be a drop-off location of the passenger, and the second destination D2 may be a location for storing an article of the passenger. In the shared vehicle service, the article may be reclaimed by the shared vehicle 20 parked in the article storing location D2 according to an article-reclaiming request included in the second call message C2 of the passenger.

In addition, according to the shared vehicle service, a third call message C3 of another passenger may be taken into consideration in setting a path for the request to store the article at the second destination D2 on the basis of pickup and drop-off information included in the third call message C3. In other words, a path of the third call message C3 may be considered in the path of the shared vehicle 20 for the first call message C1. When the path of the third call message C3 satisfies a certain criterion, the path of the third call message C3 may be considered in the path of the shared vehicle 20 for the first call message C1. The certain criterion may be related to a travel path and time which are additionally required when the path of the third call message C3 is considered in the path of the shared vehicle 20 for the first call message C1. The certain criterion may be related to whether the shared vehicle 20 lacks in capacity to additionally load an article of the user of the third call message C3.

Referring to FIG. 22, a shared vehicle management process according to a plurality of users' call messages for the same vehicle may include at least one of an operation S410 of receiving a first call message, an operation S420 of determining whether an article is included, an operation S430 of receiving a second call message, an operation S440 of determining whether the destination of the article is adjacent to the path of the second call message, an operation S450 of transmitting a dispatch message to a second passenger, and an operation S460 of transmitting a storing message to the first passenger. However, the shared vehicle management process is not limited to the above operations, and another operation may be further included or an operation thereof may be replaced by another operation as necessary.

The reception S410 of a first call message may be an operation of receiving a first call message from a first smart device of a first passenger as described above. In the reception S410 of a first call message, the first call message may be received from the first smart device of the first passenger, and the first call message may include pickup and drop-off information, user information, article information, etc. of the first passenger.

The determination S420 of whether an article is included may be an operation of determining whether article information of the user is included in the first call message received in the reception S410 of a first call message as described above. In particular, the article information may include information that the user requests that the article be stored in a certain place among the aforementioned details. Also, the article information may include volume information of the article.

The reception S430 of a second call message may be an operation of receiving a second call message from a second smart device of a second passenger after the reception S410 of the first call message. Like the first call message, the second call message may include pickup and drop-off information, user information, article information, etc. of the second passenger.

The determination S440 of whether the destination of the article is adjacent to the path of the second call message may be an operation of determining whether the destination of an article included in the article information, which has been determined in the determination S420 of whether an article is included, is adjacent to a path in which the pickup and drop-off information of the second call message is taken into consideration. The determination S440 of whether the destination of the article is adjacent to the path of the second call message may be an operation of determining whether a path between a current location of the shared vehicle 20 and the destination of the article is adjacent to the path in which the pickup and drop-off information of the second call message is taken into consideration. Whether the paths are adjacent to each other may be determined on the basis of a certain criterion. As described above, the certain criterion may be related to a travel path and time which are additionally required when the path of the second call message C2 is considered in the path of the shared vehicle 20 for the first call message C1.

The transmission S450 of a dispatch message to the second passenger may be an operation in which, when the destination of the article is determined to be adjacent to the path of the second call message in the determination S440 of whether the destination of the article is adjacent to the path of the second call message, the shared vehicle 20 passes through a path in which the destination of the article is considered a final destination and the pickup and drop-off information of the second passenger is taken into consideration, and the shared vehicle management server 30 transmits a dispatch message to the second smart device of the second passenger. In this case, the transmission S450 of a dispatch message to the second passenger may additionally include an operation of performing a security process of locking the article of the first passenger in the shared vehicle 20 with a separate authentication means when the dispatch message is transmitted to the second passenger.

The transmission S460 of a storing message to the first passenger may be an operation in which the shared vehicle management server 30 transmits a storing message of the article to the first smart device of the first passenger when the shared vehicle 20 arrives at the destination of the article, that is, the final destination after the destination of the article is not determined to be adjacent to the path of the second call message in the determination S440 of whether the destination of the article is adjacent to the path of the second call message or the dispatch message is transmitted to the second passenger. In this case, the transmission S460 of a storing message to the first passenger may additionally include an operation of opening the lock of the article of the first passenger with a separate authentication means and moving the article from the shared vehicle 20 to the storage 50 when the storing message is transmitted to the first passenger.

Referring to FIG. 23, a shared vehicle management process according to a plurality of users' call messages for the same vehicle is the same as described above with reference to FIG. 22 except for an operation S445 of determining whether the vehicle lacks in article capacity. Consequently, most details are the same as described above with reference to FIGS. 1 to 22, and only the determination S445 of whether the vehicle lacks in article capacity is described in detail.

The determination S445 of whether the vehicle lacks in article capacity may be made on the basis of whether the volume of an article of the second passenger exceeds the capacity of the shared vehicle 20 in consideration of the volume of the article of the first passenger when article information is included in the second call message of the second passenger. The determination S445 of whether the vehicle lacks in article capacity may be made on the basis of a certain criterion. The capacity of the shared vehicle 20 may be determined on the basis of a capacity stored in the shared vehicle management server 30 in advance, and the article information of the first passenger or the second passenger may be determined on the basis of article information input to the first smart device or the second smart device.

In this way, the shared vehicle service providing method according to the exemplary embodiment of the present disclosure makes it possible to store or manage an article of a user who uses the shared vehicle in a certain place. Accordingly, convenience of the use who uses the shared vehicle service can be improved, and mobility of the user is not limited. Also, the shared vehicle service providing method according to the exemplary embodiment of the present disclosure makes it possible to store an article loaded in the shared vehicle at a certain location, such as a storage of the shared vehicle, so that an article may be stored or reclaimed at a time, place, space, etc. desired by a user. Accordingly, the user who uses the shared vehicle can be less burdened with article storing.

An exemplary embodiment of the present disclosure relates to a problematic situation occurring in a process in which a user uses a shared vehicle service of an autonomous vehicle. In the shared vehicle service, the problematic situation can be smoothly solved through dispatch management in which the problematic situation is taken into consideration.

An exemplary embodiment of the present disclosure relates to article handling which occurs in a process in which a user uses a shared vehicle service of an autonomous vehicle. In the shared vehicle service, the problematic situation can be smoothly solved through dispatch management in which article handling is taken into consideration.

An exemplary embodiment of the present disclosure relates to a device, vehicle, system, and method for handling a lost article which is acquired in a process in which a user uses a shared vehicle service of an autonomous vehicle. In the shared vehicle service, when a user loses his or her article, the lost article can be safely reclaimed by a passenger or a vehicle.

An exemplary embodiment of the present disclosure relates to a device, vehicle, system, and method for handling a lost article which is acquired in a process in which a user uses a shared vehicle service of an autonomous vehicle. In the shared vehicle service, vehicle dispatch may be systematically managed by considering an emergency situation such as a user losing his or her article.

An exemplary embodiment of the present disclosure relates to a device, vehicle, system, and method for handling article storing which occurs in a process in which a user uses a shared vehicle service of an autonomous vehicle. In the shared vehicle service, when a user leaves his or her article, the article can be stored safely by a passenger or a vehicle.

An exemplary embodiment of the present disclosure relates to a device, vehicle, system, and method for reclaiming am article acquired in a process in which a user uses a shared vehicle service of an autonomous vehicle. In the shared vehicle service, vehicle dispatch may be systematically managed by considering an emergency situation such as the user reclaiming his or her article.

Effects of the present disclosure are not limited to those described above, and effects not mentioned above will be clearly understood by those of ordinary skill in the art from the present disclosure and the accompanying drawings.

Although the present disclosure has been described above with limited exemplary embodiments and drawings, various modifications and changes can be made from the above description by those of ordinary skill in the art. For example, even when the described techniques are performed in a different order than the described method, and/or components of the described system, structure, device, circuit, etc. are combined or joined in a different form than the described method or replaced or substituted by other components, an appropriate result may be achieved.

Therefore, other implementations, other embodiments, and equivalents to the claims also fall within the scope of the following claims.

What is claimed is:

1. A method for providing a shared vehicle service performed by a server communicating with a user device of a passenger and a plurality of autonomous vehicles, comprising:
   storing a plurality of locations configured to store an article of the passenger;
   obtaining a plurality of autonomous vehicle locations based on an autonomous vehicle location received from each of the plurality of autonomous vehicles;
   receiving, from a first user device, a first call message including a request to transport a first passenger and a first article of the first passenger to different locations,
      wherein the first call message includes a pickup location, a drop-off location and a storage location,
      wherein the pickup location indicates a location where the first passenger and the first article board,
      wherein the drop-off location indicates a location where only the first passenger drops off,
      wherein the storage location indicates a location where only the first article is unloaded,
      wherein the pickup location and the drop-off location are determined regardless of the plurality of locations, and
      wherein the storage location is determined as one of the plurality of locations;
   selecting a first autonomous vehicle to be dispatched to the first passenger based on the pickup location and the plurality of autonomous vehicle locations;

dispatching the first autonomous vehicle to sequentially drive to the pickup location, the drop-off location and the storage location;

in response to receiving a second call message comprising a request to reclaim the first article of the first passenger, selecting a second autonomous vehicle to be dispatched to the first passenger based on the storage location and the plurality of autonomous vehicle locations, wherein the second call message further comprises a reclaim location;

dispatching the second autonomous vehicle to carry the first article to the reclaim location; and transmitting a notification message to the first user device, wherein the notification message comprises a reclaim fee of the first article calculated based on the reclaim location and the storage location.

2. The method of claim 1, further comprising:

in response to the first autonomous vehicle arriving at the storage location, transmitting a first notification message to the first user device, wherein the first notification message indicates that the first article of the first passenger is stored in the storage location.

3. The method of claim 2, wherein the first notification message includes at least one of a barcode, a quick response (OR) code, radio frequency identification RFID), a password, a pattern, or biometric recognition, configured to store and reclaim the first article of the first passenger.

4. The method of claim 2, wherein the first notification message includes a storage fee of the first article calculated based on the drop-off location and the storage location.

5. The method of claim 1, wherein the storage location includes a storage space configured to store the first article of the first passenger.

6. The method of claim 5, wherein the storage space is set to be secured or unsecured by at least one of a barcode, a quick response (OR) code, radio frequency identification (RFID), a password, a pattern, or biometric recognition.

7. The method of claim 1, further comprising:

in response to the first autonomous vehicle being dispatched, changing a service state of the first autonomous vehicle from an available state to a reserved state;

in response to the first passenger riding the first autonomous vehicle, changing the service state of the first autonomous vehicle from the reserved state to an in-use state; and in response to the first article being unloaded at the storage location, changing the service state of the first autonomous vehicle from the in-use state to the available state.

8. The method of claim 7, wherein the service state of each of the plurality of autonomous vehicles is one of the available state, the reserved state, and or the in-use state, and wherein the selecting comprises:

selecting the first autonomous vehicle from among the plurality of autonomous vehicles whose service state is in the available state to be dispatched to the first passenger based on the pickup location and the plurality of autonomous vehicle locations.

\* \* \* \* \*